(12) United States Patent
Wu et al.

(10) Patent No.: US 8,712,473 B2
(45) Date of Patent: Apr. 29, 2014

(54) SYSTEM AND METHOD FOR SEAMLESSLY INCREASING DOWNLOAD THROUGHPUT

(75) Inventors: John Wu, San Diego, CA (US); Slim Souissi, San Diego, CA (US)

(73) Assignee: Novatel Wireless, Inc., San Diego, CA (US)

( * ) Notice: Subject to any disclaimer, the term of this patent is extended or adjusted under 35 U.S.C. 154(b) by 102 days.

(21) Appl. No.: 13/536,993

(22) Filed: Jun. 28, 2012

(65) Prior Publication Data

US 2012/0331111 A1  Dec. 27, 2012

Related U.S. Application Data

(63) Continuation-in-part of application No. 13/094,665, filed on Apr. 26, 2011, now Pat. No. 8,521,142, which is a continuation-in-part of application No. 13/075,110, filed on Mar. 29, 2011, now Pat. No. 8,442,504, which is a continuation-in-part of application No. 11/754,934, filed on May 29, 2007, now Pat. No. 7,917,129, which is a continuation of application No. 09/938,357, filed on Aug. 23, 2001, now Pat. No. 7,224,964, application No. 13/536,993, which is a continuation-in-part of application No. 13/110,872, filed on May 18, 2011.

(60) Provisional application No. 60/227,427, filed on Aug. 23, 2000, provisional application No. 61/345,887, filed on May 18, 2010.

(51) Int. Cl.
*H04M 1/00* (2006.01)

(52) U.S. Cl.
USPC ............................ 455/556.2; 455/414.1

(58) Field of Classification Search
USPC ................. 455/414.1, 414.2, 557, 556.2
See application file for complete search history.

(56) References Cited

U.S. PATENT DOCUMENTS

| | | | |
|---|---|---|---|
| 2009/0164522 A1* | 6/2009 | Fahey | 707/104.1 |
| 2012/0331111 A1* | 12/2012 | Wu et al. | 709/219 |
| 2013/0100928 A1* | 4/2013 | Matsumori et al. | 370/331 |

* cited by examiner

*Primary Examiner* — Creighton Smith
(74) *Attorney, Agent, or Firm* — Procopio, Cory, Hargreaves & Savitch LLP; Noel C. Gillespie

(57) ABSTRACT

A system and method for seamlessly increasing download throughput in a wireless wide area network (WWAN) device is herein disclosed. Remote file servers frequently impose per connection transfer limits upon host devices that are requesting files for download. In order to bypass these limitations, a WWAN device acting as a proxy server can replace a single file request with a series of independent requests over multiple connections, each requesting a separate portion of the original file. The blocks of requested data can then be reassembled at the WWAN device before being transferred to the device requesting the file. A user of the requesting device can therefore benefit from increased download rates, yet without having to download or install any additional software within the requesting device.

20 Claims, 25 Drawing Sheets

SYSTEM AND METHOD FOR SEAMLESSLY INCREASING DOWNLOAD THROUGHPUT

RELATED APPLICATIONS INFORMATION

This application is a continuation-in-part of U.S. patent application Ser. No. 13/094,665, filed Apr. 26, 2011, which is a continuation-in-part of U.S. patent application Ser. No. 13/075,110, filed Mar. 29, 2011, which is a continuation-in-part of U.S. patent application Ser. No. 11/754,934, filed May 29, 2007, issued on Mar. 29, 2011 as U.S. Pat. No. 7,917,129, which is a continuation of U.S. patent application Ser. No. 09/938,357, filed Aug. 23, 2001, issued on May 29, 2007 as U.S. Pat. No. 7,224,964, which claims priority from U.S. Provisional Application No. 60/227,427, filed Aug. 23, 2000, all of which are incorporated herein by reference in their entireties.

This application is also a continuation-in-part of copending U.S. patent application Ser. No. 13/110,872 filed on May 18, 2011, which itself claims priority from U.S. Provisional Application No. 61/345,887, filed May 18, 2010, and entitled "Mobile Intelligent Media Server that Seamlessly Connects TV," all of which are incorporated herein by reference in their entireties.

This application is also related to U.S. patent application Ser. No. 12/537,970 filed Aug. 7, 2009, which claims priority to U.S. Provisional Patent Application Ser. No. 61/178,926, filed May 17, 2009 and entitled "Rule Based Internet Browser Redirect for Wireless WWAN Routers," both of which are incorporated herein by reference in their entireties as if set forth in full.

BACKGROUND

1. Technical Field

The embodiments described herein generally relate to wireless communication and more particularly to systems and methods for seamlessly increasing download throughput between a single source and a single destination in a WWAN device through fragmentation and reassembly of http and ftp requests.

2. Related Art

Wireless modems exist that can be inserted, or otherwise interfaced with a computer and that enable data communication over a wireless Wide Area Network (WAN) such as a cellular type network. Early versions of these cards had connectors that complied with the PCMCIA standard and that were inserted into a slot in the side of the computer. Newer versions have USB connectors for interfacing with the computer. Such modems allow access to the Internet, or World Wide Web (WWW), even where no wired network connection exists and are most often interfaced with a laptop or other portable computing device.

FIG. 1 illustrates a conventional system 100 in which a data connection can be established over a wide area network using a conventional wireless modem 104. In FIG. 1, modem 104 is interfaced, e.g., via a PCMCIA slot or USB connection, with a computing device 106 via connection 110. Modem 104 can then establish a data connection between base station 102, associated with, e.g., a cellular type network, and computer 106. Modem 104 and base station 102 can communicate via wireless signals 108.

FIG. 2 is a flow chart illustrating a conventional process by which such a data connection can be established. First, in step 202, a user of computing device 106 inserts, or connects modem 104 with computer 106. In step 204, modem 104 is then tethered to computing device 106. Once modem 104 is tethered to computing device 106, a connection manager running on computing device 106 can be launched in step 206. The connection manager will often display whether the network, i.e., the WAN, is available. If it is, then in step 208 the user can select the network, which will cause a Point-to-Point Protocol (PPP) connection to be established between base station 102 and computer 106 via modem 104 in step 210.

In networking, the PPP is a data link protocol commonly used to establish a direct connection between two networking nodes. It can provide connection authentication, transmission encryption privacy, and compression. PPP is used over many types of physical networks including serial cable, phone line, trunk line, cellular telephone, specialized radio links, and fiber optic links such as SONET. For example, most Internet service providers (ISPs) use PPP for customer dial-up access to the Internet. PPP is commonly used as a data link layer protocol for connection over synchronous and asynchronous circuits, where it has largely superseded the older, non-standard Serial Line Internet Protocol (SLIP) and Telephone Company mandated standards, such as Link Access Protocol, Balanced (LAPB) in the X.25 protocol suite. PPP is designed to work with numerous network layer protocols, including Internet Protocol (IP), Novell's Internetwork Packet Exchange (IPX), NBF, and AppleTalk.

SUMMARY

Systems and methods for seamlessly increasing download throughput within a network device are disclosed herein. The method is applicable in both a direct usage and by using a proxy that performs the fragmentation and reassembly. One embodiment of a proxy is with a WWAN device.

In a first exemplary aspect of the invention, a method of seamlessly increasing download throughput is disclosed. In one embodiment, the method comprises: receiving a request to download a file, the request being received at a wireless wide area network device; determining a number of connections for the wireless wide area network device to open with a remote device that is hosting the file; opening said number of connections; downloading constituent portions of the file over said number of connections, the constituent portions of the file being downloaded at the wireless wide area network device; reassembling the constituent portions of the file at the wireless wide area network device, thereby forming the file; and transmitting the file to a requesting device.

In a second exemplary aspect of the invention, a wireless wide area network device is disclosed. In one embodiment, the wireless wide area network device comprises: a receiver adapted to receive a request to download a file; a connections analysis module in electrical communication with the receiver, the connections analysis module adapted to determine a number of connections to open with a remote device that is hosting the file; a network interface module in electrical communication with the connections analysis module, the network interface module adapted to download constituent portions of the file over said number of connections; a reassembly module in electrical communication with the network interface module, the reassembly module adapted to reassemble the constituent portions of the file; and a data transmissions module in electrical communication with the reassembly module, the data transmissions module adapted to transmit the file to the requesting device.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

In the embodiments below, an IMHS is used to interface a plurality of computing device or LAN client devices with a wireless WAN. For example, the WAN can be configured to implement one of the Third Generation (3G) protocols, such as EDGE, CDMA2000, or the Universal Mobile Telecommunications System (UMTS) protocols, High Speed Packet Access (HSPA) or HSPA+ protocols, Long Term Evolution (LTE) protocols, Evolution Data Optimization (EV-DO) rev. A (DOrA), WiMAX, or other newer 4G protocols. The computing devices interface with the IMHS over a wireless Local Area Network (LAN) such as a WiFi network, wireless USB network, ultrawideband network, or a Zigbee network; however, it will be understood that the descriptions that follow are not intended to limit the embodiments herein to particular standards or architectures, the embodiments being provide by way of example only.

Figure 1:
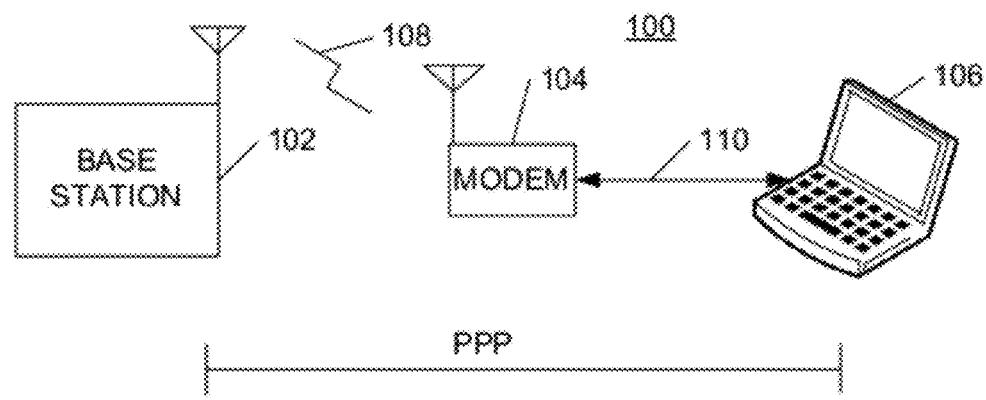
FIG. 1 is a diagram illustrating a conventional system for using a wireless modem to access a WAN.
Figure 2:
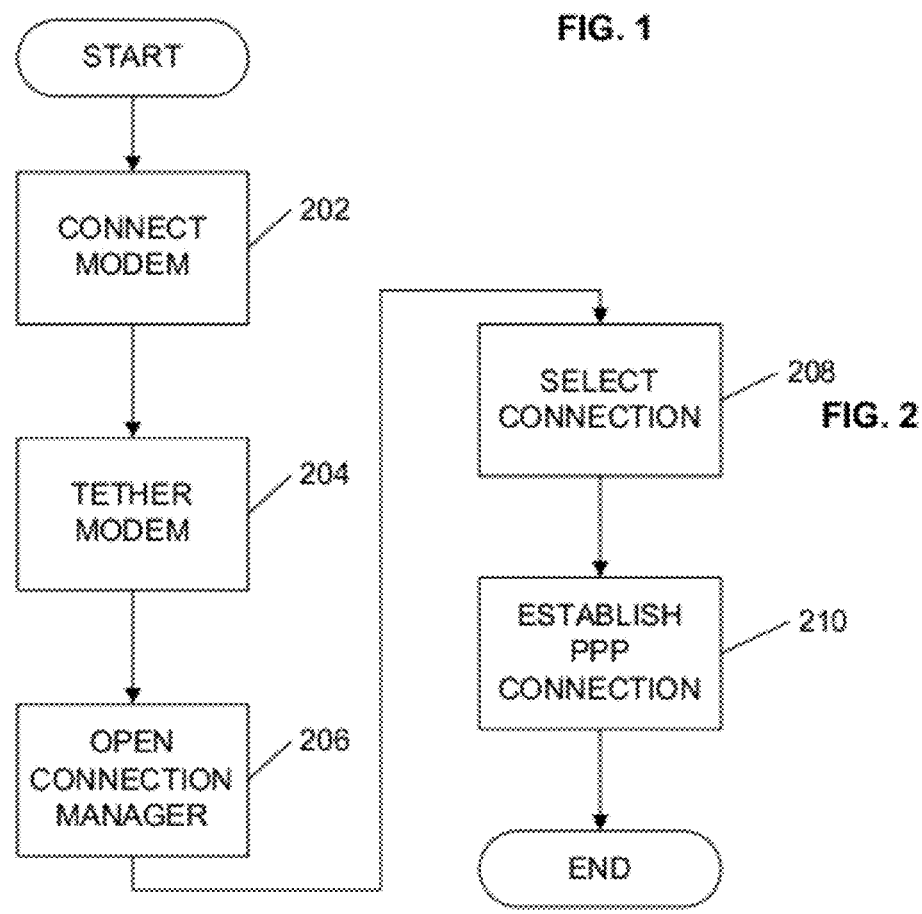
FIG. 2 is a flow chart illustrating a conventional process for establishing a data connection using a modem included in the system of FIG. 1.
Figure 3:
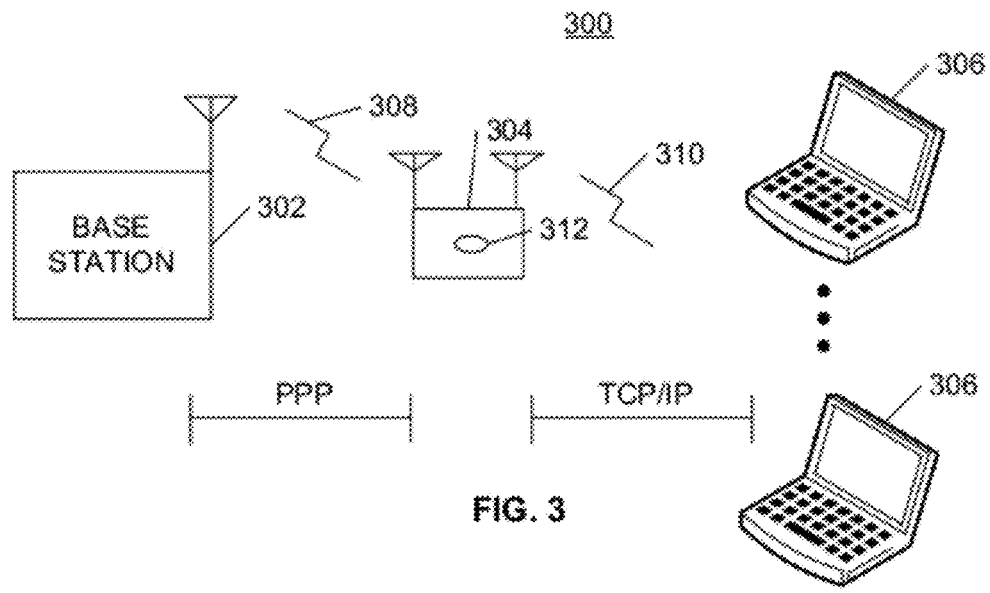
FIG. 3 is a diagram illustrating an example system for using an Intelligent Mobile HotSpot (IMHS) to access a WAN in accordance with one embodiment.

FIG. 3 is a diagram illustrating an example system 300 for using an IMHS to access a WAN in accordance with one embodiment. Central to system 300 is IMHS 304. While not illustrated in detail in FIG. 3, IMHS 304 can comprise two radio communication interfaces: one for communicating with a base station 302 associated with a WAN, and one for communicating with a plurality of computing or wireless LAN client devices 306 via a wireless LAN. Thus, IMHS 304 can communicate with base station 302 via wireless signals 208 and with devices 306 via wireless signals 310, where signals 308 and 310 implement different protocols associated with the related network.

Figure 4:
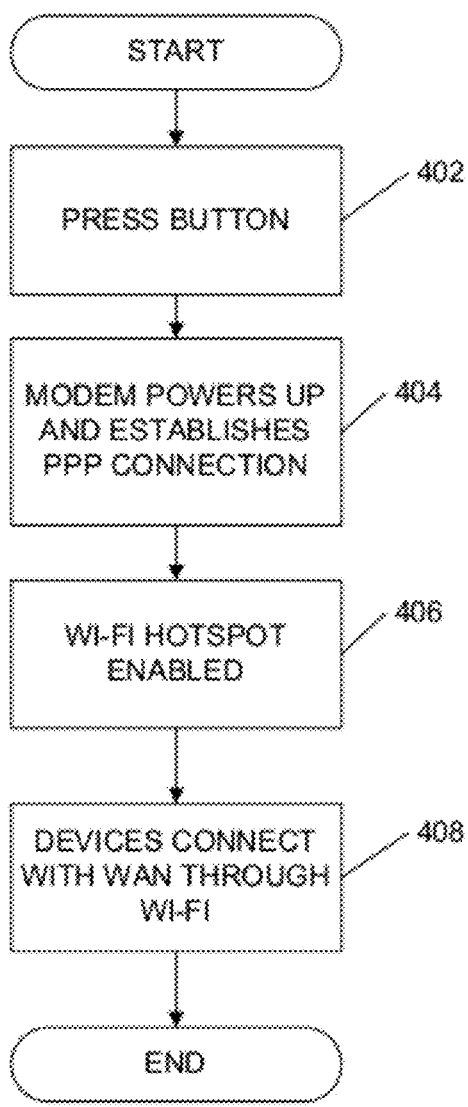
FIG. 4 is a flow chart illustrating an example process for establishing a data connection using an IMHS included in the system of FIG. 3 in accordance with one embodiment.

In certain embodiments, IMHS 304 can, e.g., be configured to interface as many as five (5) computing devices 306 with base station 302. FIG. 4 is a flow chart illustrating an example process by which devices 306 can be interfaced with base station 302. As can be seen in FIG. 3, IMHS 304 can comprise a single power button, or switch 312, when a user presses button 312 to power on IMHS 304, in step 402, then IMHS 304 will power up and automatically establish a data connection, e.g., a PPP connection, with base station 302 in step 404. As illustrated, this PPP connection is between base station 302 and IMHS 304 and not between base station 302 and devices 306. In step 406, IMHS 304 will then enable the LAN. In step 408, devices 306 can automatically connect to the WAN through IMHS 304 and the LAN connections 310. In other words, IMHS 304 can act as a wireless LAN access point for devices 306. Communication between IMHS 304 and devices 306 can be via TCP/IP over WiFi. In certain embodiments, the users of devices 306 must provide a password when accessing the LAN. The password can be printed on device 304 or displayed on device 304.

Thus, all that is required to enable multiple computing devices 306 to access the wireless WAN is to power on IMHS 304, and possibly provide a password. IMHS 304 will automatically establish a connection with the WAN and enable the wireless LAN hotspot in response. There is no tethering of IMHS 304 with devices 306.

Figure 5:
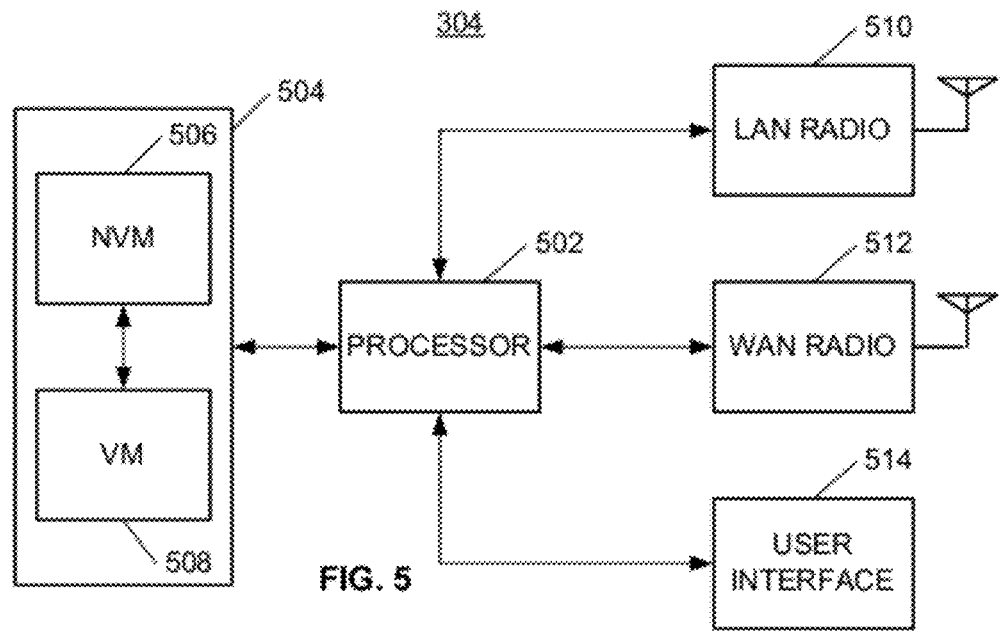
FIG. 5 is a diagram illustrating example components that can be included in an IMHS included in the system of FIG. 3 in accordance with one embodiment.

FIG. 5 is a diagram illustrating certain components that can be included in IMHS 304 in accordance with one embodiment. It will be understood that additional components can be included in IMHS 304. The example of FIG. 5 is not intended to exhaustively show all components, but rather is provided by way of example to illustrate certain components in relation to the systems and methods described herein. As such, the example of FIG. 5 should not be seen as limiting the systems and methods described herein to a certain design or architecture. Moreover, the components illustrated in FIG. 5 are obviously depicted at a high level. It will be understood that the components can actually be implemented via multiple components such as multiple integrated circuits, discrete device, or both, and can be packaged in a single package or in multiple packages. It will also be understood that IMHS 304 is often battery powered and therefore will comprise a battery (not shown).

Referring to FIG. 5, IMHS 304 can comprise a processor 502 interfaced with memory 504, LAN radio 510, WAN radio 512, and user interface 514. Processor 502 will often comprise several processing cores such as a digital signal processing core, a microprocessing core, math-coprocessors, etc.

Memory 504 can comprise several forms of memory, such as non-volatile memory 506 and volatile memory 508. Non-volatile memory is used to store data and instructions that should be maintained even when power is removed from IMHS 304. Volatile memory is used to store instructions and data for which it is not important whether it is maintain when power is removed. For example, the code used to run IMHS 304 can be stored in non-volatile memory 506 such that it is maintained even when IMHS 304 is turned off and so that IMHS 304 can access this code when it is turned on again; however, the code can be copied to volatile memory 508 when IMHS 304 is on. This can, for example, allow faster access to instructions and data by processor 502.

Examples of non-volatile memory include Read-Only Memory (ROM), flash memory, and most types of magnetic computer storage devices, e.g., hard disks, floppy disks, and magnetic tape and optical discs, although these later devices are not generally used for IMHS 304. Rather, the former, which can be referred to as electrically addressed non-volatile memories are typically used for IMHS 304. Non-volatile memory is typically used for the task of secondary storage, or long-term persistent storage. Most forms of non-volatile memory have limitations that make them unsuitable for use as primary storage. Typically, non-volatile memory either costs more or performs worse than volatile random access memory. Electrically addressed non-volatile memories can include a Programmable ROM (PROM), Erasable PROMs (EPROM), Electrically erasable PROM (EEPROM), Flash memory, or some combination thereof.

Volatile memory, also known as volatile storage or primary storage device, is computer memory that requires power to maintain the stored information, unlike non-volatile memory which does not require a maintained power supply. The most widely used form of primary storage today is a volatile form of random access memory (RAM), meaning that when the computer is shut down, anything contained in RAM is lost. Most forms of modern RAM are volatile storage, including Dynamic Random Access Memory (DRAM) and static random access memory (SRAM). Thus, IMHS 304 can include DRAM, SRAM, or some combination thereof, although IMHS 304 is more likely to include SRAM than DRAM.

In certain embodiments, some portion or even all of non-volatile memory 506, volatile memory 508, or both can be included with processor 502.

LAN radio 510 can comprises all of the hardware required for the radio front end of the wireless LAN interface. Similarly, WAN radio 512 can comprises all of the hardware required for the radio front end of the wireless WAN interface. Processor 502 or components thereof can serve as the processing backend for both radios 510 and 512. Alternatively, separate processing circuitry can be included for each of the LAN function and the WAN function. In such embodiments, the processing functionality described herein can be included in either the LAN processing circuitry or the WAN processing circuitry.

User interface 514 can comprise just button 312. But in other embodiments, it can also comprise a display, e.g., to display a password.

Instructions stored in memory 504 can be used by processor 502 to control the operation of IMHS 502 including control of radios 510 and 512. Thus, the instructions stored in memory 504 should include instructions for controlling the operation of radios 510 and 512 as well as for bridging communications between basestation 320 and devices 306 and for configuring IMHS 304. In certain embodiments, the instructions for controlling WAN radio 512, and the authentication procedures for connecting to the WAN, can be included in standard code associated with WAN radio 512. These instructions can be referred to as modem instructions. Separate instructions for controlling the remaining functions of IMHS 304 can then also be stored in memory 504, including the procedures and settings for controlling LAN radio 510. These instructions can be referred to as router instructions.

Figure 6:
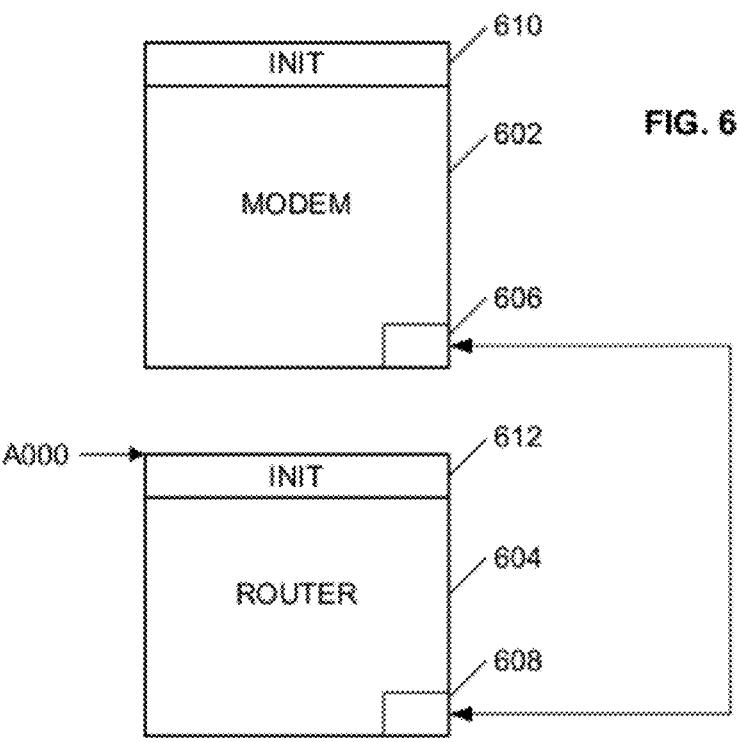
FIG. 6 is a diagram illustrating modem and router instructions that can be loaded into volatile memory in the IMHS of FIG. 5 in accordance with one embodiment.

FIG. 6 is a diagram illustrating examples blocks of instructions that can be stored in memory 504. For example, the instructions can be stored in non-volatile memory 506 and can, e.g., be copied to volatile memory 508 during operation. As can be seen, the instructions illustrated in FIG. 6 can comprise modem instructions 602 and router instructions 604. Each set of instructions can comprise an initialization routine 610 and 612 respectively, and be associated with a function table 606 and 608 respectively. Router instructions 604 can also be associated with an offset or known address, e.g., A000, at which it should be loaded into volatile memory.

Figure 7:
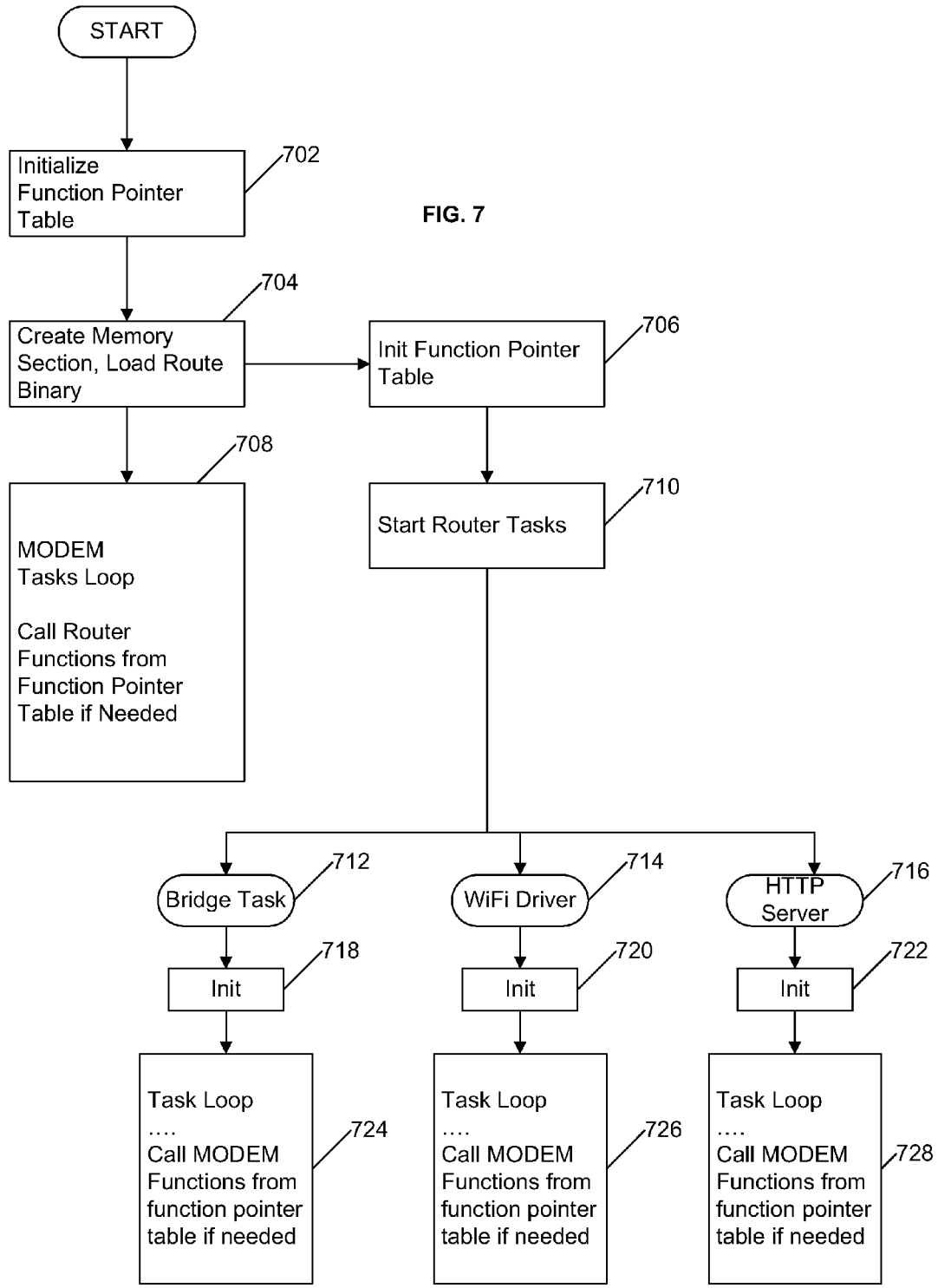
FIG. 7 is a diagram illustrating an example method for loading and initializing the modem and router instructions of FIG. 6 in accordance with one embodiment.

A process for allowing these two sets of instructions to interact must then be implemented in such embodiments. FIG. 7 is a flow chart illustrating an example process for loading modem instructions and router instructions into volatile memory 508 for execution by processor 502 and for configuring the instructions to interact with each other. In step 702, on boot up, e.g., activation of button 312, modem initialization function 610 can generate a modem function pointer table 606, which can be populated with modem functions. In step 704, a block of memory can be reserved in volatile memory 508, e.g., at the known offset address, and router instructions 604 can be loaded into the reserved block in nonvolatile memory 508. Router initialize function 612 can then be called in step 706. Initialization function 612 in the router instructions 604 can then populate function table 608 with router functions. Modem instructions 602 will need to use, or call certain functions included in router instructions 604. Similarly, router instructions 604 will need to call certain functions in modem instructions 602. Accordingly, the initialization functions can cause each set of instructions to exchange pointers to the relevant functions, such that modem function table 606 will include pointers to the relevant functions in router instructions 604 and router function table 608 will include pointers to the relevant functions in modem instructions 602.

Alternatively, a single function table with the appropriate functions and pointers can be created and used by both modem and router instructions 602 and 604; however, it will be understood that how the function tables are described is a matter of convenience and that what is important is that there is an association between functions and pointers to functions in the various instructions that is maintained within IMHS 304.

Initialization function 612 can also be configured to create a set of related tasks, e.g., an http server task, a WiFi driver task, a bridge task, etc. For example, once the functional tables are initializes, the router instructions can start to run in step 708. Different tasks can then be called in steps 712, 714, and 716, which can cause initialization functions related with each tasks to run in steps 718, 720, and 722. These initialization functions can then initialize the related tasks such that they can run in steps 724, 726 and 728.

On successful initialization, router instructions 604 can be configured to notify modem instructions 602 through either a return value or a signal.

Modem instructions 602 can start to run in step 708. As the modem instruction and router tasks run, they can communicate with each other using the set of function pointers populated in the function pointer tables. For example, a typical function that a router task can use is "efs_open" or "rex_sleep." Modem instructions 602 can, for example, call a transmit function in the router WiFi driver or it can call the address translate functions.

Figure 8:
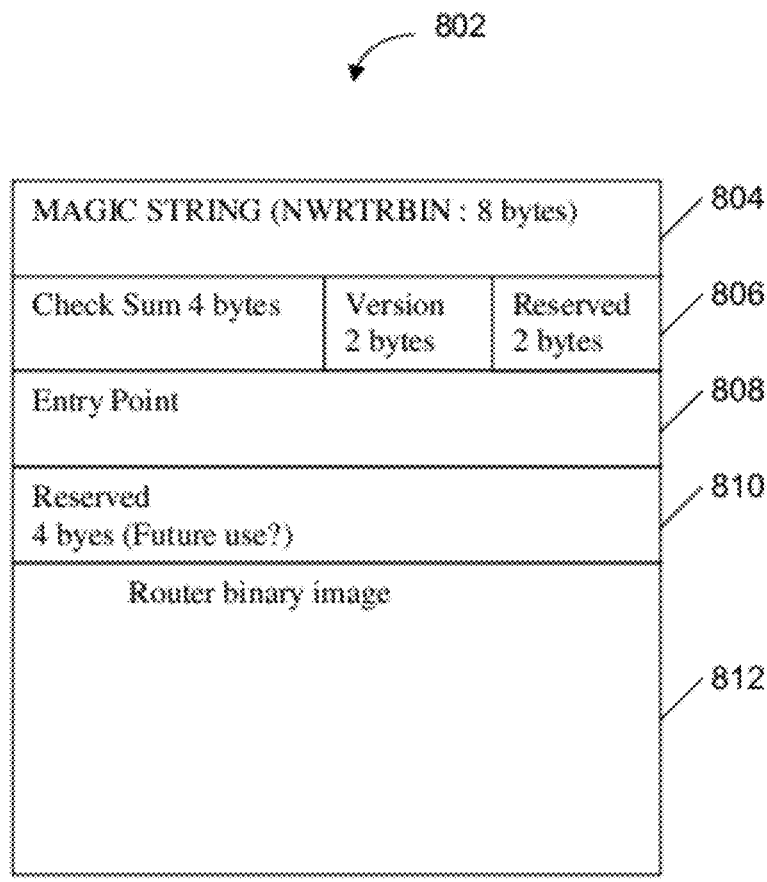
FIG. 8 is a diagram illustrating an example image of the router instructions of FIG. 6 in accordance with one embodiment.

A partition table for memory 504 can for example have one additional, e.g., 3 MB partition for router instructions 604. Router instructions 604 can be built into a binary file from, e.g., an elf file. FIG. 8 is a diagram illustrating an example image 802 of router instructions 604 in accordance with one embodiment. A header can be added to the binary and can include a signature field 804, for the image signature; a checksum field 806, which can, e.g., comprise a 4 byte checksum and a 2 byte version, as well as 2 reserved bytes; and entry point field 808 to hold the address offset; and a 4 byte reserved field 810. Image 802 can then mostly consist of the binary image 812 for instructions 604.

On boot up, the operating system can verify the checksum, version compatibility, and magic string from the image header before proceeding to the next step, e.g., step 702.

Accordingly, router instructions 604 are not statically linked into modem instructions 602. Rather, they will be compiled and linked into a separate binary with a fixed entry point (offset address) specified in the router image header. This binary can then be loaded at that exact location specified by the offset address at run time. The memory location specified by the offset address should specify a block of memory that is not used by the memory instructions. Once the memory section is created, the router binary except the header can then be loaded at the address where the image was created. After the modem instruction initialization is completed, it will call an initialization function located in the router binary. This location will be known to the modem instructions because where the router binary was loaded in the memory will be known. The router initialization function can then populate the rest of the function pointers in the structure described above for the modem instructions. Form this point on the modem and router instructions can communicate with each other using the set of functions that have been saved in the function pointer table.

Once IMHS 304 is powered up, the connection with base station 302 is establish, the LAN is activated, and IMHS 304 will be ready to route data packets from devices 306 to base station 302. Devices 306 can then access, e.g., the Internet through IMHS 304. All that may be required for devices 306 to access the Internet, or more generally the WAN associated with base station 302 is a password, which can be displayed in IMHS 304. Contrast this with system 100 in which only a single device 106 can access the WAN.

Figure 9A:
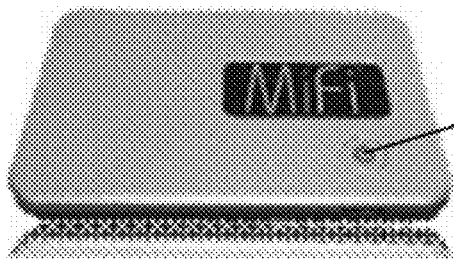
FIGS. 9A-D are diagrams illustrating various example implementations of an IMHS.
Figure 9B:
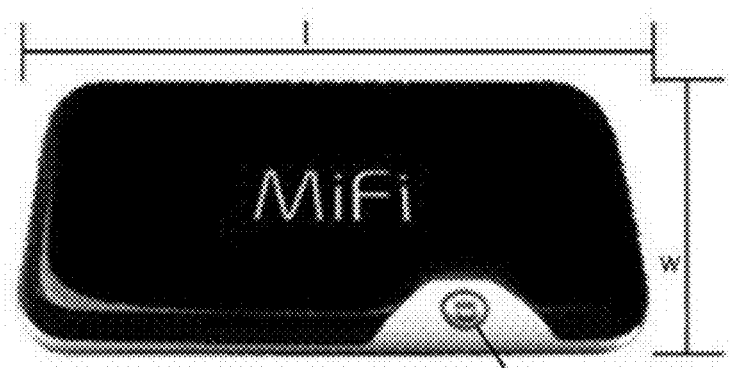
Figure 9C:
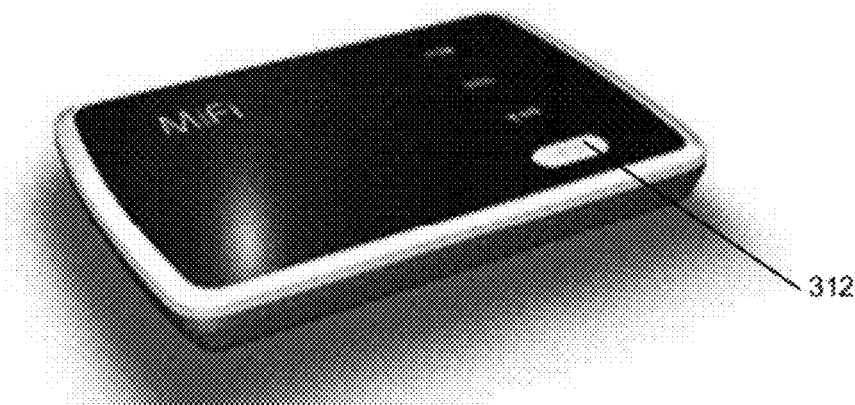
Figure 9D:

FIGS. 9A-D are diagrams illustrating various example implementations of IMHS 304. As can be seen, each implementation includes a single button 312. Additionally, as illustrated in FIG. 9D, IMHS 304 can include a USB or other data connection 902 for interfacing with IMHS 304. In certain embodiments, IMHS 304 can be approximately credit card sized. In other words, IMHS 304 can comprise a length (l) and width (w) that are very close to those of a credit card. In addition, IMHS 304 can comprise a thickness that is very thin. While it may be thicker than a credit card, the overall dimensions can be such that IMHS can easily fit in a pocket or even a wallet.

The acceptance and availability of new technologies can increase the functionality of an IMHS 304 and enable greater convergence within the home and in the vehicle. For example, the deployment of 4G LTE worldwide and the expansion of WiMAX in the United Stated means that throughput for wireless WANs can exceed fixed lines speeds in many markets, e.g. 5-12 Mbps. Further, the cost per byte relative to 3G will go down significantly and 4G devices will be increasingly affordable for the average consumer. The availability of new smart phone operating systems that provide free and open access and access to an established application development community will also increase the availability of applications that can take advantage of these new, faster networks.

In addition, the availability of small, cost effective, low power, media processors for portable devices that can provide processing speeds of greater than 1 GHZ and are this more than adequate for mobile environments increase the types of power of media applications that can be included in smaller portable devices. Examples include the Qualcomm SnapDragon, TI OMAP, Intel Atom, and others. Further, new compression technology is enabling the business case for mobile Video downloads.

As a result, 4G modems can compete more effectively against DSL & cable lines for fixed access within the home and vehicle and enable convergence between fixed and mobile access that overcomes the issues that have prevented successful integration in the past. Wireless Broadband will take market share from fixed broadband, but as explained below and IMHS can allow mobility to complement fixed access and provide a unique combined value proposition where portability of the user experience is key.

Accordingly, in certain embodiments, an IMHS such as described above can serve as a media server that can, for example, connect with a television or other in home display. Such an IMHS can include such hardware and software as a graphics processor, web server, media gateway, applications layer, etc. The IMHS can then be configured to interface with, e.g., a television and allow users to access content through the IMHS and display the content on the television. This is illustrated in the examples of FIGS. 10A and 10B.

Figure 10A:
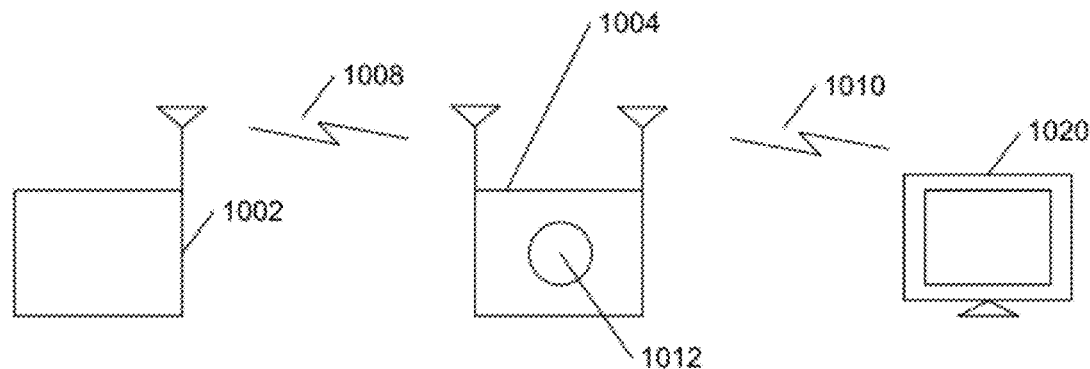
FIGS. 10A and 10B are diagrams illustrating an example router configured to act as a media server in accordance with one embodiment.
Figure 10B:
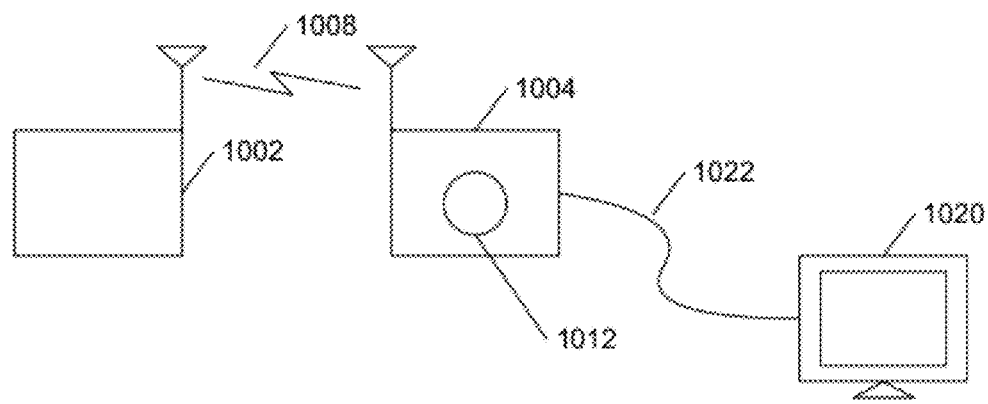

In FIG. 10A, IMHS 1004 in wirelessly interfaced with television 1020. In FIG. 10B, IMHS 1004 is connected with television 1020 via a wire. The connection between IMHS 1004 and television 1020 can be accomplished via Infra red, WiFi, WAN, Wireless HDMI, UWB, a cable or other means of wireless communication. Cable 1022 can, for example, be a HDMI cable, USB cable, or other cable capable of carrying information including audio and visual information. Thus, IMHS 1004 can include a cable connection port or interface configured to connect with cable 1022. An example of such an interface is illustrated in FIG. 9D.

IMHS 1004 can then be wireless connected via radio signals 1008 with a base station or router 1002. Base station or router 1002 can be part of the wireless WAN or part of a local Area Network (LAN), e.g., within the home, or both, depending on the embodiment.

Figure 11:
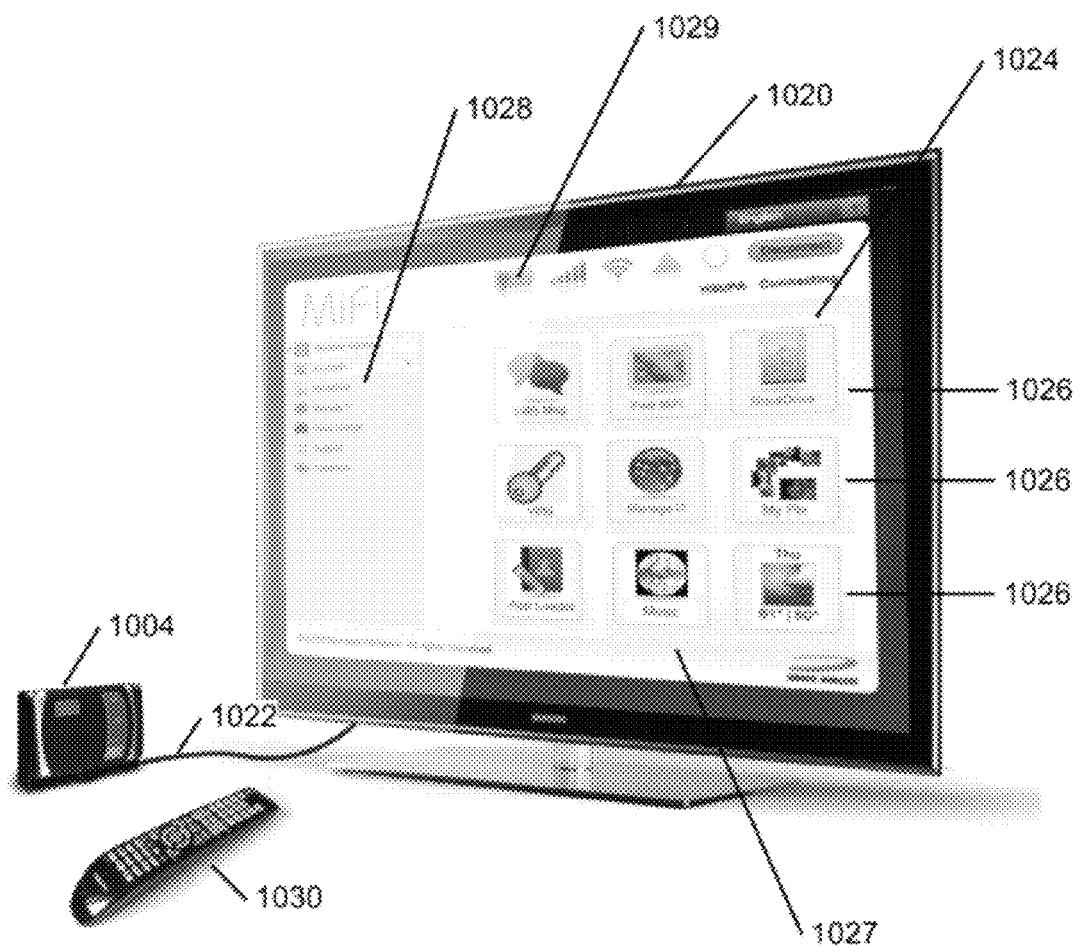
FIG. 11 is a diagram illustrating the router of FIG. 10B automatically displaying a landing page in an in-home display.

Once connected, IMHS 1004 can be configured to project a landing page on television 1020 as illustrated in FIG. 11. In this example, IMHS 1004 is connected via a wire 1022 to, e.g., the television HDMI port. Once connected, landing page 1024 can be displayed. Page 1024 can comprise a status bar 1029 and a navigation pane 1028. Page 1024 can also comprise an area 1027 that displays a plurality of content or applications 1026 that can be access via the landing page 1024 and IMHS 1004.

A user can access carrier specific content or applications 1026, or other content, including visual voice mail and SMS messages; pictures in a photo album; music, content stored in a NovaDrive™ or carrier cloud storage; download Vcast video clips; download new carrier or other applications; access home content from, e.g., any home PC, Blueray, Netgear storage Vault, DLNA server, cloud content, e.g., from cable/DSL/FIOS, Netflix account; download movies and content for use while mobile; access Kodak gallery; etc. It will be recognized that the above are by way of example only.

IMHS 1004 can be configured such that a user must only press button 1012 in order to establish the required connectivity and automatically display the landing page 1024. In certain embodiments, a user can then navigate throughout the landing page 1024 and access media widgets 1026 with a standard remote control 1030. Thus, landing page 1024 can comprise a widget, application (app), or the like associated with various content. The user can then access the content by simply activating the app. Such apps or widgets can, e.g., include a Netflix widget to watch movies; a Pandora widget to listen to radio music; a Kodak widget to view a photo gallery; a Cloud/local storage widget to access pre-stored, e.g., DLNA content; a Carrier CommCenter widget to check visual voice mail and SMS; a Carrier media widget for music, photos, movies, books; etc. In fact as explained in more detail below, numerous peripheral devices can be replaced by widgets or apps that can be accessed via the landing page 1024.

Figure 12:
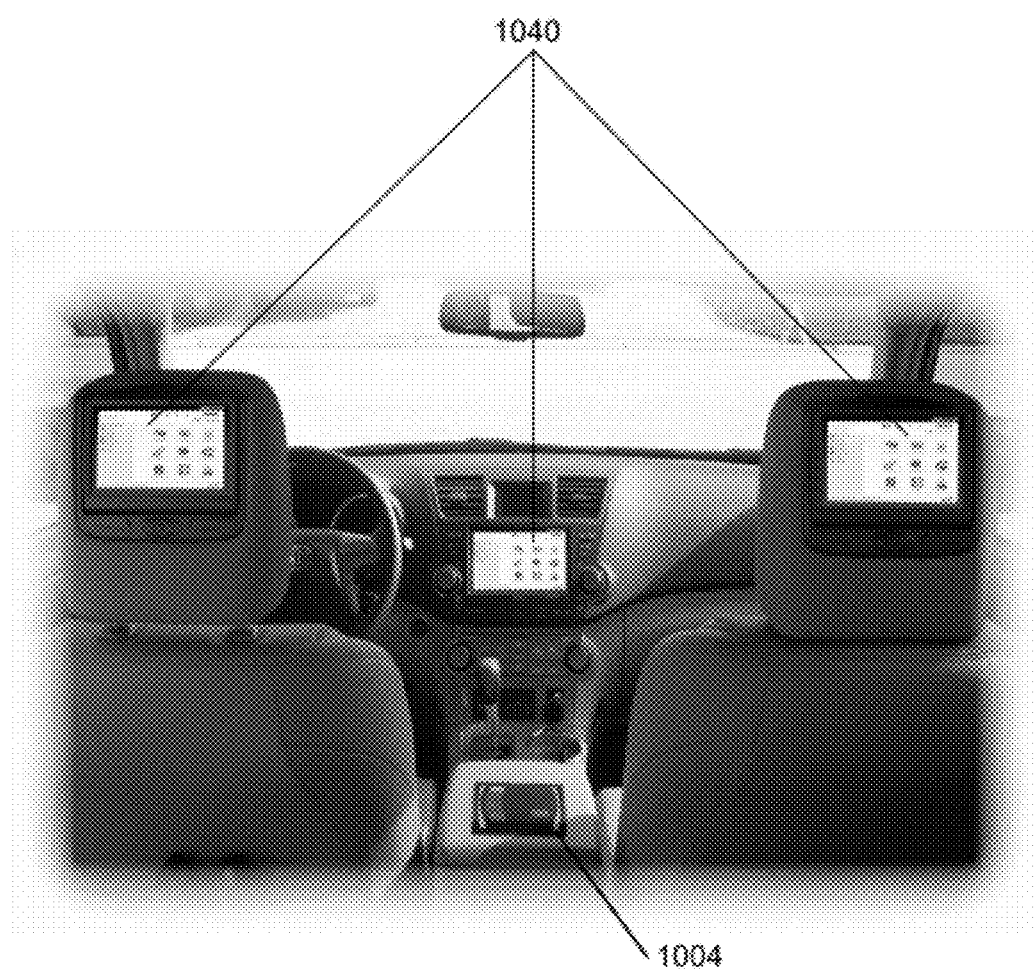
FIG. 12 is a illustrating a router automatically displaying a landing page on an in-vehicle display.

In other embodiments, a IMHS can similarly interface with displays within a vehicle as illustrated in FIG. 12. As can be seen, the IMHS 1004 can be placed within the vehicle and can interface with displays 1040 via, e.g., a WLAN connection such as a WiFi connection. The WiFi connection can for example be a WiFi 802.11n connection. A landing page 1024 can then be displayed on one or more of displays 1024. Displays 1040 can comprise touch screen technology to allow navigation of landing page 1024.

In certain embodiments, the content accessed via landing page 1024 on displays 1040 can be synchronized with the home content on display 1020. Thus, portability and mobility can be integrated with the fixed in home access illustrated in FIG. 11. It will be understood that the user experience may need to be adjusted, e.g., such things as Resolution, throughput, LBS etc.

Applications that can be available and that may be attractive for in car use can include turn by turn navigation that uses, e.g., a NIM like carrier Application, an application that allows viewing of pre-stored movies or downloading of new movies, television viewing, a music application, a web browser, games, picture viewing, etc. Accordingly, devices such as a navigation devices, DVD players, radios, etc., can be replaced by applications for the mobile environment that are accessed via landing page 1024 in the vehicle.

Figure 14:
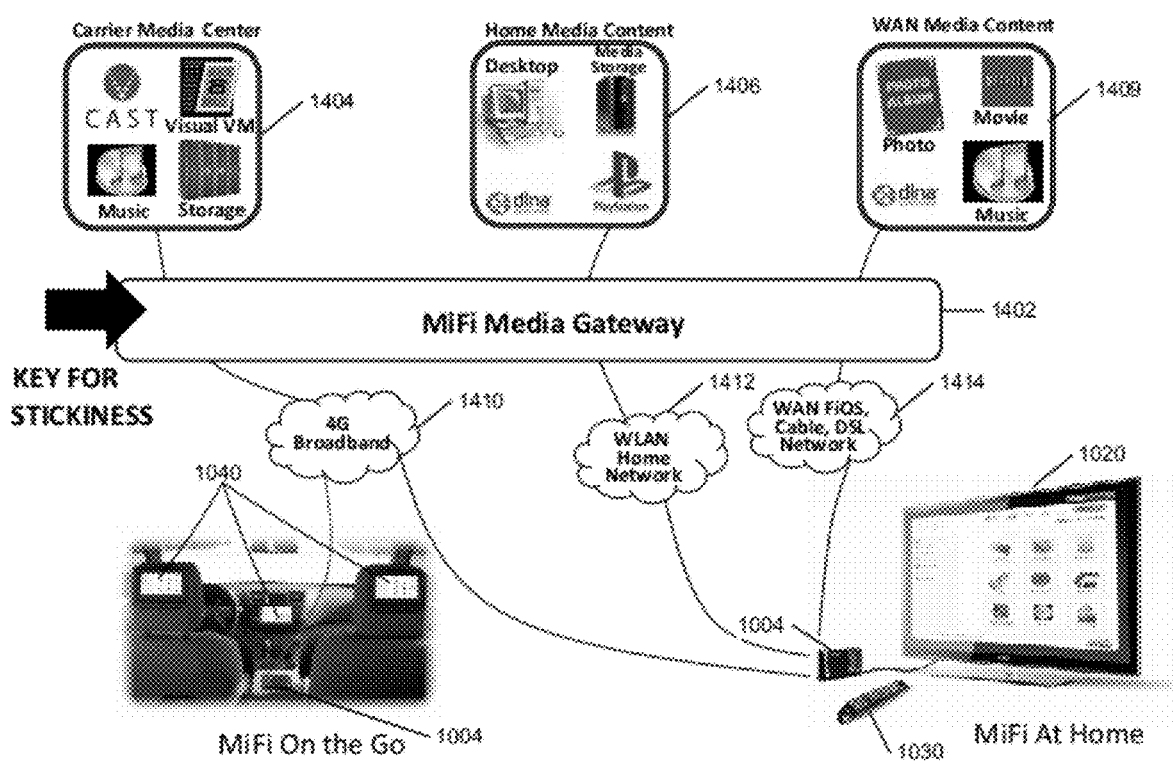
FIG. 14 is a diagram illustrating the types of content and network connections that can be available via the router of FIG. 10A or 10B.

IMHS 1004 can seamlessly connect to the 4G carrier network to allow access to the various content associated with the widgets and applications available in vehicle. When the user returns home, IMHS 1004 can be configured to automatically handoff from the WWAN, e.g., 4G network, to the in home network, e.g., WLAN. Thus, a seamless integration between mobile and fixed content access can be created as illustrated in FIG. 14. As can be seen, the mobile and fixed environments can be interfaced with a media gateway 1402 included in IMHS 1004. The media gateway 1402 can then be interfaced with various content sources via various networks, protocols and connection means 1410, 1412, and 114. The media gateway 1402 can then be interfaced with various content including carrier content 1404, home media content 1406, and other content 1408 access via the WAN 1414.

Thus, when IMHS 1004 is activated, e.g., via button 1012, it can automatically power up, detect whether an in-vehicle display 1040 or an in-home display, e.g., television 1020 is present, establish a connection therewith, then automatically push the landing page 1024 to the display, and automatically connect with either the WAN or the LAN. For example, if IMHS 1004 is in vehicle, then it can connect with the WAN after powering up in order to access various content. If it is in home, then it can connect with either the WAN or the LAN in order to access various content. In certain embodiments, IMHS 1004 can be configured to handoff from the WAN to the LAN as the device moves from the vehicle to the home and vise versa.

In certain embodiments, various peripheral devices can actually be replaced by the systems and methods illustrated above as illustrated in FIG. 13. In these embodiments, a peripheral device is complemented, or substituted for with an application or widget 1026. This allows for simplicity and ease of use; lower cost of acquisition; portability of the apps and services; intelligent determination of mobile vs. fixed environments; agents that allows for matching the service to the environment in terms of, e.g.: resolution (movie, photo), storage limits, throughput, etc. Thus, the IMHS can be capable of seamlessly connecting to a home network or a carrier network and capable of storing and processing content from either network and pushing to the display of a TV screen. The processing of the content depends on the type of network and the type of device connected to the IMHS. In certain embodiments, an intelligent agent capable of matching video resolution to content displayed and peripheral device in use can be included in IMHS 1004.

Figure 13:
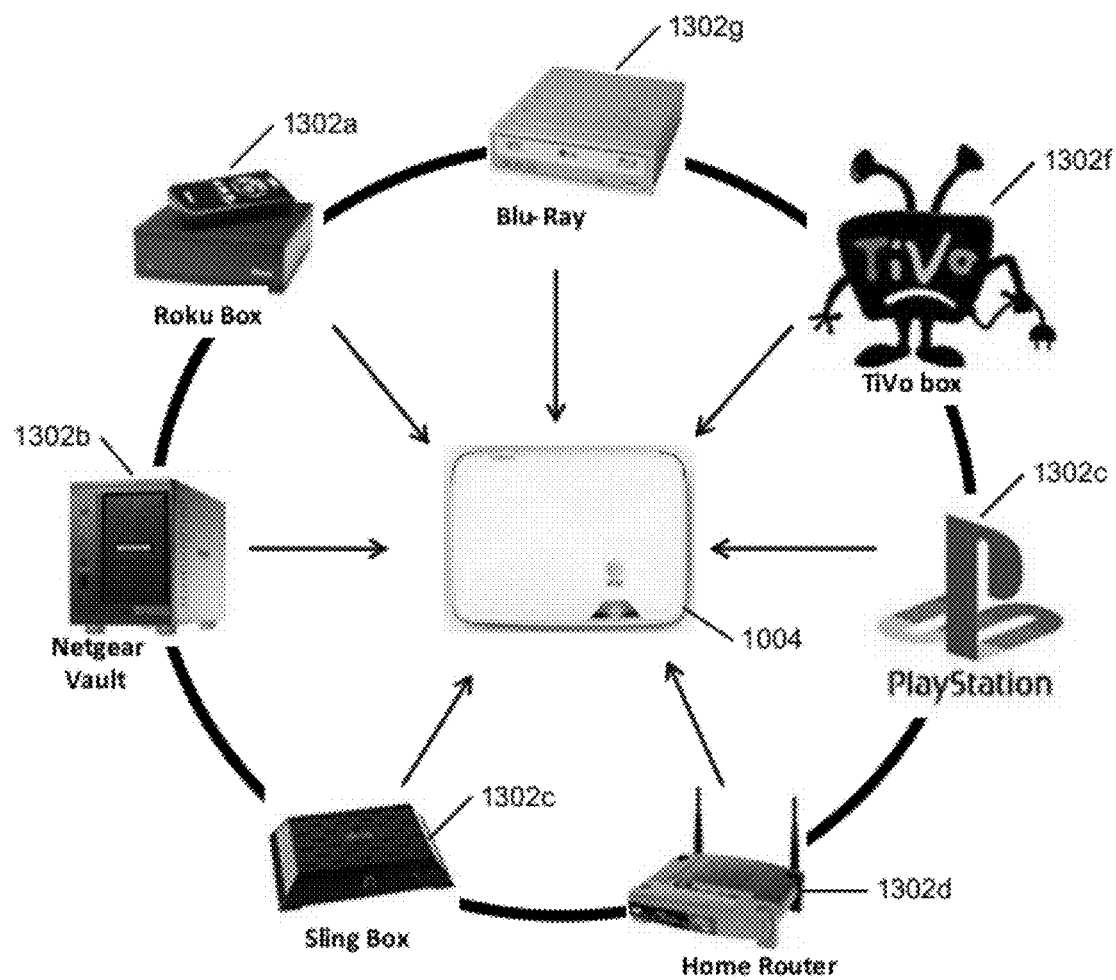
FIG. 13 is a diagram illustrating various peripheral devices that can be replaced by application running on the router of FIG. 10A or 10B.

FIG. 13 illustrated some of the devices that can be replaced by applications 1026 available via landing page 1024. Thus, many devices can be converged into one small, portable device. Again, or in addition to those shown in FIG. 13, these devices can include a remote control, router, camera, VCR, TV, music player, Internet, TiVo, video player, eBook reader, phone, navigator, picture frame, AD platform, etc. Such a peripheral device is simply replaced by an application with connection (1410-1414) to the associated content.

Figure 15:
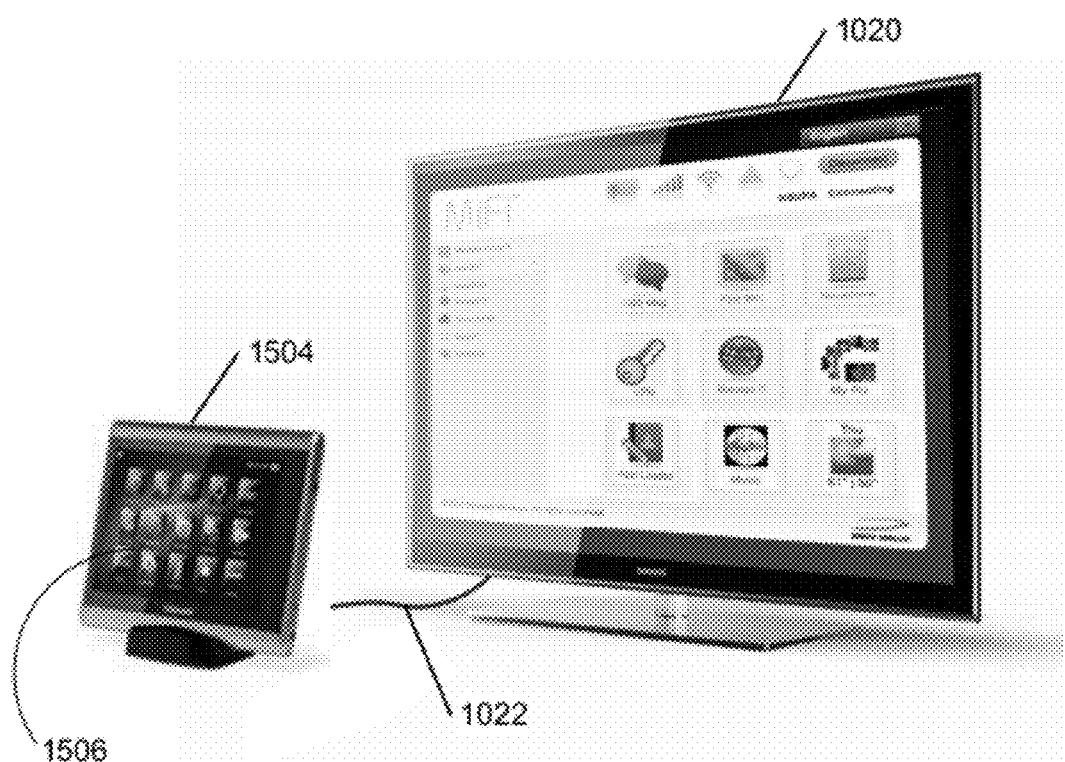
FIG. 15 is a diagram illustrating an example router configured to act as a media server in accordance with another embodiment.

In certain embodiments, a display can be added to the IMHS as illustrated in the example of FIG. 15. As can be seen, IMHS 1504 includes a display 1506. In this example, IMHS 1504 is connected via a wire or cable 1022 with television 1020. In addition to being able to display landing page 1024 on television 1020, now content and applications can also be displayed on IMHS 1504. This can allow the user to select content, such as a video on display 1506 and cause it to be instantly sent to television 1020 for display. It will be understood that the need for a remote can then be eliminated.

While IMHS 1504 is illustrated as being interfaced with television 1020 via a cable 1022, it will be understood that a wireless connection, such as a Infra red, WiFi, WAN, Wireless HDMI, UWB, or other wireless connection can be used. Moreover, button 1012, the activation of which can cause the landing page 1024 or content to be automatically displayed on display 1020 or display(s) 1040, can be replaced by a virtual button on display 1506.

Downloading files from a remote computing device has become an increasingly popular activity over the last several decades, especially with the explosion of household and office Internet use, broadband access, social media websites, e-mail, and compressed multimedia content. The public's perpetual demand for improved download speeds has driven various segments of the market toward more efficient networking solutions. This is especially true with the advent of high definition video formats which present video frames at significantly higher visual quality, but can often require up to eight times the bandwidth to transmit than their standard definition equivalents.

As demand for portable networking devices becomes more prevalent in society, a paradigm shift is expected to occur within the realm of Internet networking Fixed broadband access mechanisms (such as cable modems and digital subscriber lines) are expected give way to wireless broadband technologies which may utilize, for example, wireless wide area networking (WWAN) devices configured to run separate networking protocols. These WWAN devices utilize cellular connections in order to enable a user to have a mobile Internet hotspot. In order to compete with fixed broadband technologies, however, it is desirable for such devices to utilize methods which optimize network transfer speeds.

Figure 16A:
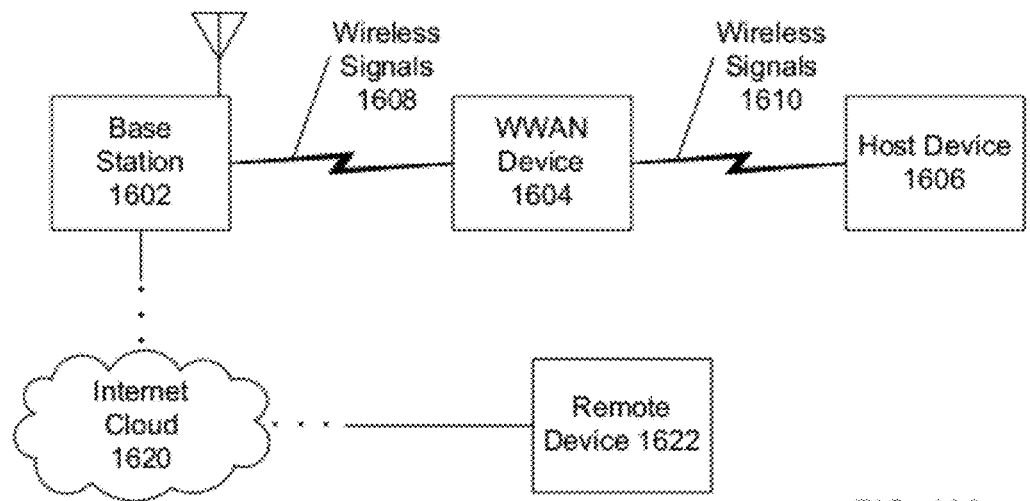
FIG. 16A is a block diagram illustrating a first exemplary network topology in accordance with one embodiment.
Figure 16B:
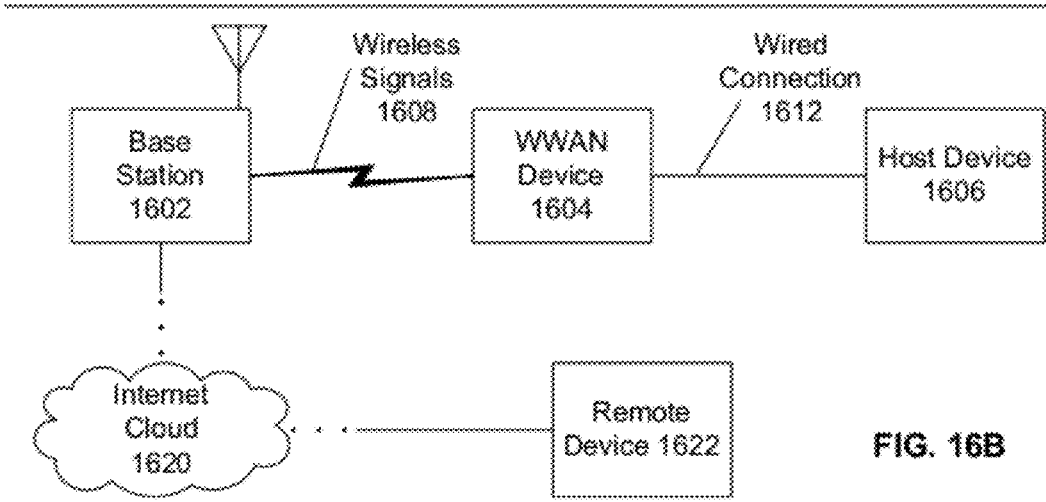
FIG. 16B is a block diagram illustrating a second exemplary network topology in accordance with one embodiment.
Figure 16C:
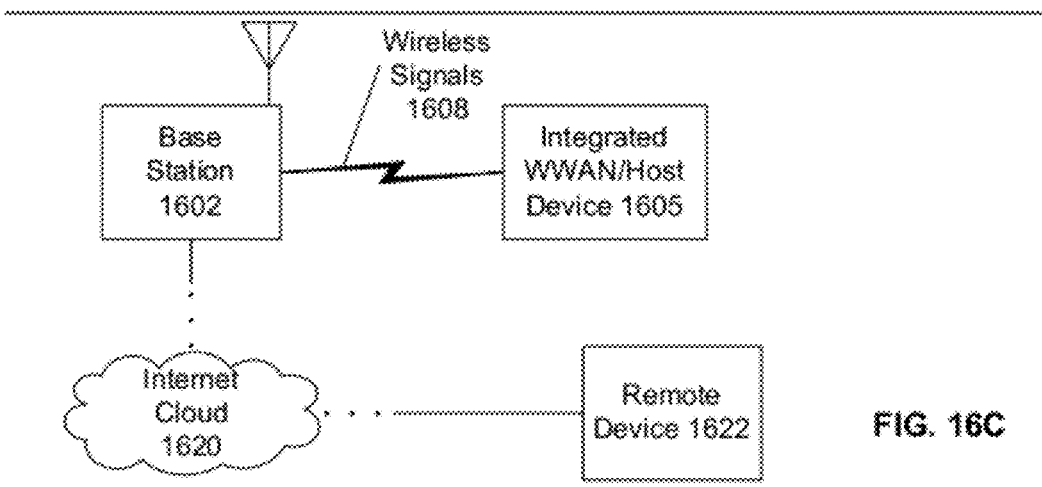
FIG. 16C is a block diagram illustrating a third exemplary network topology in accordance with one embodiment.

FIGS. 16A-16C are block diagrams illustrating exemplary network topologies for supporting increased download throughput in a WWAN environment according to embodiments of the present invention. This WWAN environment can be configured to implement any number of networking protocols—from Third Generation (3G) protocols, such as EDGE, CDMA2000, or the Universal Mobile Telecommunications System (UMTS) protocols, High Speed Packet Access (HSPA) or HSPA+ protocols, Long Term Evolution (LTE) protocols, Evolution Data Optimization (EV-DO) rev. A (DOrA), WiMAX, to newer 4G protocols. It will be understood that the descriptions that follow are not intended to limit the embodiments herein to particular protocols, standards, architectures, or network arrangements—the depicted embodiments being provided by way of example only.

Referring first to FIG. 16A, a WWAN device 1604 (which may include, for example, some or all of the features of the IMHS detailed above) is adapted to wirelessly bridge a host device 1606 with a cellular base station 1602. Depending upon the configuration that is selected, the wireless interface between the base station 1602 and the WWAN device 1604 may be the same or different interface as the interface used between the WWAN device 1604 and the host device 1606. Therefore, the wireless signals 1608 and 1610 may contain data of a similar or different format according to various embodiments of the invention. According to some embodiments, the host device 1606 may connect with the WWAN device 1604 over a Wi-Fi or Bluetooth connection, while the WWAN device 1604 may connect with the base station 1602 over a Point-to-Point protocol (PPP).

The base station 1602 and WWAN device 1602 may therefore enable host device 1606 to access one or more files stored within a remote device 1622 that is connected to the Internet. Communication between the remote device 1622 and the base station 1602 may occur through one or more intermediary nodes (referred to generally in FIG. 16A as Internet Cloud 1620) according to various embodiments.

FIG. 16B depicts an alternative network topology according to one embodiment of the present invention. In FIG. 16B, the host device 1606 is connected to the WWAN device 1604 by a wired connection 1612 as opposed to a wireless connection. Any type of wired connection interface may be used for this purpose. For example, a high-speed serial bus protocol (such as USB or FireWire) may be used to directly interface the host device 1602 with the WWAN device 1604.

FIG. 16C depicts another alternative network configuration. According to some embodiments, the functionality of the host device 1606 can be integrated within the WWAN device 1604 so as to form an integrated WWAN/host device 1605. According to this arrangement, the single integrated computing device 1605 depicted in FIG. 16C (which may be, for example, a cellular phone, tablet, or laptop computer) may be used to interface with the base station 1602 and ultimately the remote device 1622.

Although FIGS. 16A-16C generally depict various network configurations for enabling a host device 1606 access to a file stored within a remote device 1622 that is connected to the Internet, it is to be understood that the present invention encompasses remote devices 1622 that may be situated on any type of network, not necessarily the Internet. For example, the remote device 1622 may be an electronic phone accessible over a telecommunications network (circuit or packet switched). Additionally, although FIGS. 16A-16C generally depict a base station 1602 configured to communicate with a WWAN device 1604 on a cellular network, it is to be understood that the following embodiments may be generalized to a wide variety of other network configurations (including, without limitation, hybrid-fiber optic cable networks, local area networks, and metropolitan area networks).

When a user wishes to download a file from a remote device that is hosting files over a shared network (e.g., a web server), networking software (such as a network monitoring utility) resident within the remote device will frequently specify a maximum download rate for that connection. One reason for the imposed limit is to prevent a single device from tying up the majority of available bandwidth which might prevent, slow down, or otherwise delay the processing of file transfer requests from other network devices.

During non-peak hours of network operation, however, a file transfer request may still be limited by the remote network monitoring utility. This would occur, for example, if the remote network monitoring utility utilized a number of static rules for governing how each connection to the remote device is to be handled. Thus, there may be situations where there is plenty of additional bandwidth available to support a higher volume of data transmission (and hence a faster download speed). However, due to the static transfer caps imposed by the remote network monitoring utility, the user may nonetheless be prevented from taking advantage of what would otherwise be available bandwidth.

Various embodiments of the present invention address this problem by providing functionality within the WWAN device 1604 that serves as a workaround to the maximum transmission rate limits imposed by network monitoring utilities. The workaround takes advantage of the fact that maximum transmission rate rules are frequently "per connection" limits. Thus, by opening multiple connections with the same device, where each connection requests a separate part of the file, more bandwidth becomes available for an entire download task, and hence, download speeds can be significantly increased.

Various embodiments of the present invention contain this functionality within the WWAN device 1604 itself. This enables a user to take advantage of increased download speeds but without having to download, configure, and execute a separate download utility within the host device 1608. This particular feature is highly advantageous since many computer users would not have the technical savvy to use install or to use such a utility. Moreover, even if such a utility existed, many users would likely not be aware of it. However, when the functionality underlying increased download transmission rates is contained within the WWAN device 1604 itself, such functionality may be automatically operable and yet completely or substantially hidden from the user according to various embodiments.

Figure 17:
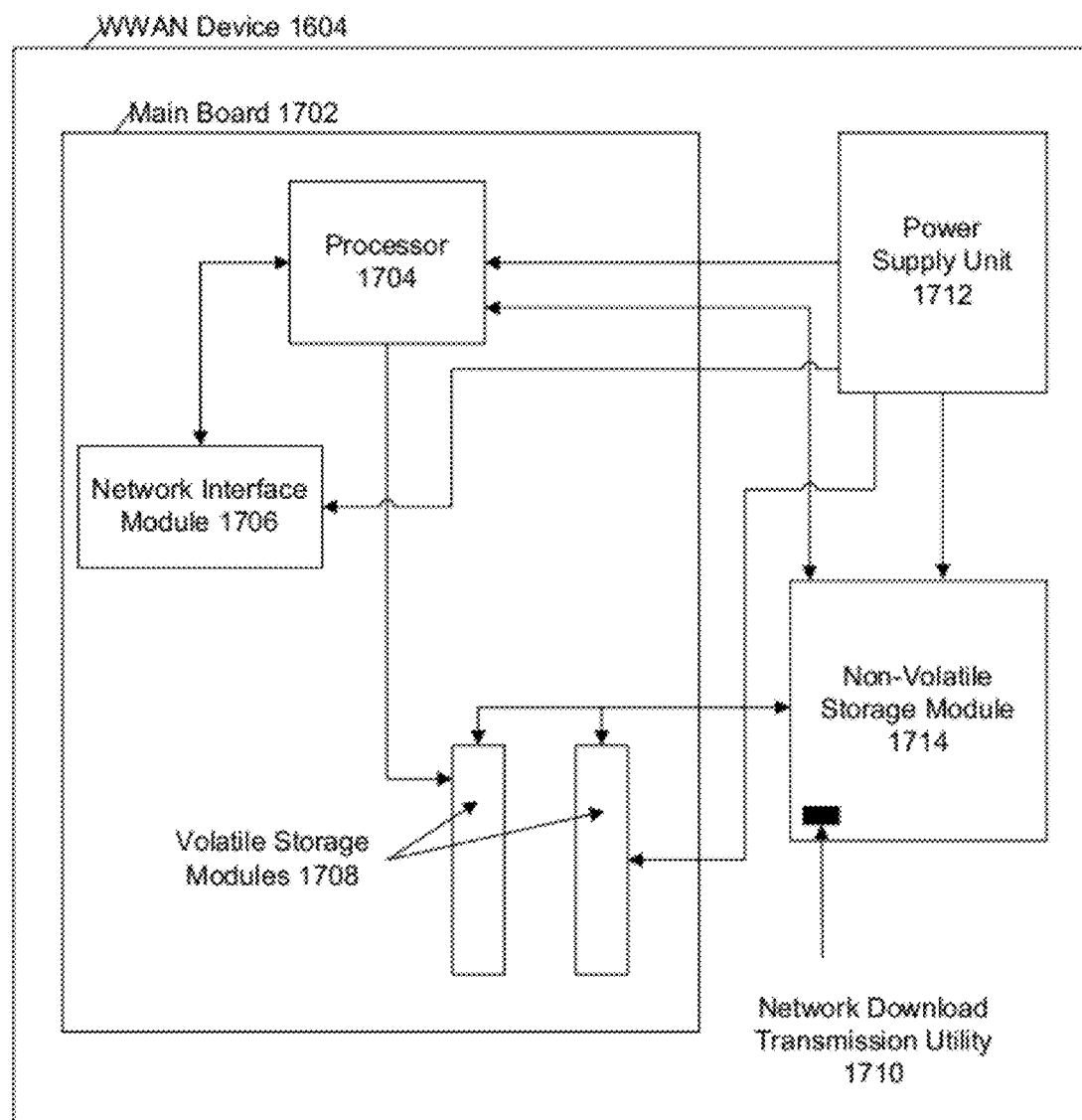
FIG. 17 is a block diagram of an exemplary WWAN device containing a network download utility configured to increase download transmission speeds in accordance with one embodiment.

FIG. 17 is a block diagram of an exemplary WWAN device 1601 containing a network download utility configured to increase download transmission speeds according to one embodiment of the present invention.

The power supply 1712 provides a source of power to the various modules disposed within the WWAN device 1604. In some embodiments, power may be supplied externally from one or more conductive wires, for example, as via an AC adapter or serial bus cable. In other embodiments, a battery may be used as a source of power. Note that while the power is depicted as being directly supplied to various modules disposed within the main board 1702, such is only depicted as a means of illustration. Persons skilled in the art will recognize that power may be supplied to main board 1702 and a single location and may thereafter be distributed among the various modules electrically connected to main board 1702.

One or more processors 1704 are adapted to execute sequences of instructions by loading data from and storing data to a local memory module (for example, volatile storage modules 1708, which may be implemented as any combination of static and/or dynamic RAM according to embodiments of the presently disclosed invention). Possible instructions may include, without limitation, instructions for data conversions, formatting operations, arithmetic operations, communication instructions, and/or storage and retrieval operations.

A non-volatile storage module 1714 may be used to persistently store data, instructions, process states, memory tables, and other information within the WWAN device 1604. The non-volatile storage module 1714 may be implemented as any type or combination of memory adapted for persistent storage, including, without limitation, conventional hard disks, ROM (e.g. PROM, EPROM, EEPROM), flash memory, etc. Note also that in some embodiments, all or a portion of the non-volatile memory module 208 may serve as virtual memory for the volatile storage modules 1708.

A network interface module 1706 is adapted to facilitate wireless communications between the WWAN device 1604 and a cellular base station 1602 (as depicted in FIGS. 16A-16C). In some embodiments, the network interface module 1706 may include a network interface card with one or more antennae (not shown), the card containing an internal memory source adapted to buffer sent or received data. While only a single network interface module 1702 is depicted in FIG. 17, it is to be understood that additional network interface modules may be incorporated within the WWAN device 1604 in order to facilitate additional network communications using the same or separate network protocols. For example, in addition to supporting a PPP connection between the WWAN device 1604 and the base station 1602, the WWAN device may be further configured for Wi-Fi communications between the WWAN device 1604 and the host device 1606 (as shown in FIG. 16A), and as well as a USB connection for interfacing with a host device 1604 over a high speed serial bus cable (as shown in FIG. 16B). Thus, separate network interface modules 1706 supporting Wi-Fi and USB connectivity may be employed for these purposes.

Resident within non-volatile storage module 1714 is a network download transmission utility 1710. The network download transmission utility 1710 serves to increase download transmission rates for host devices 1606 connected to the Internet via the WWAN device 1604. When the WWAN device 1604 is powered on, portions of the network download transmission utility 1710 may be copied to the volatile storage modules 1708 so as to enable the processor 1704 to have faster access to data. Note that while FIG. 17 depicts the network download transmission utility 1710 as being embodied purely in software, the network download transmission utility 1710 may be composed of any combination of software, firmware, and hardware according to embodiments of the present invention.

Figure 18:
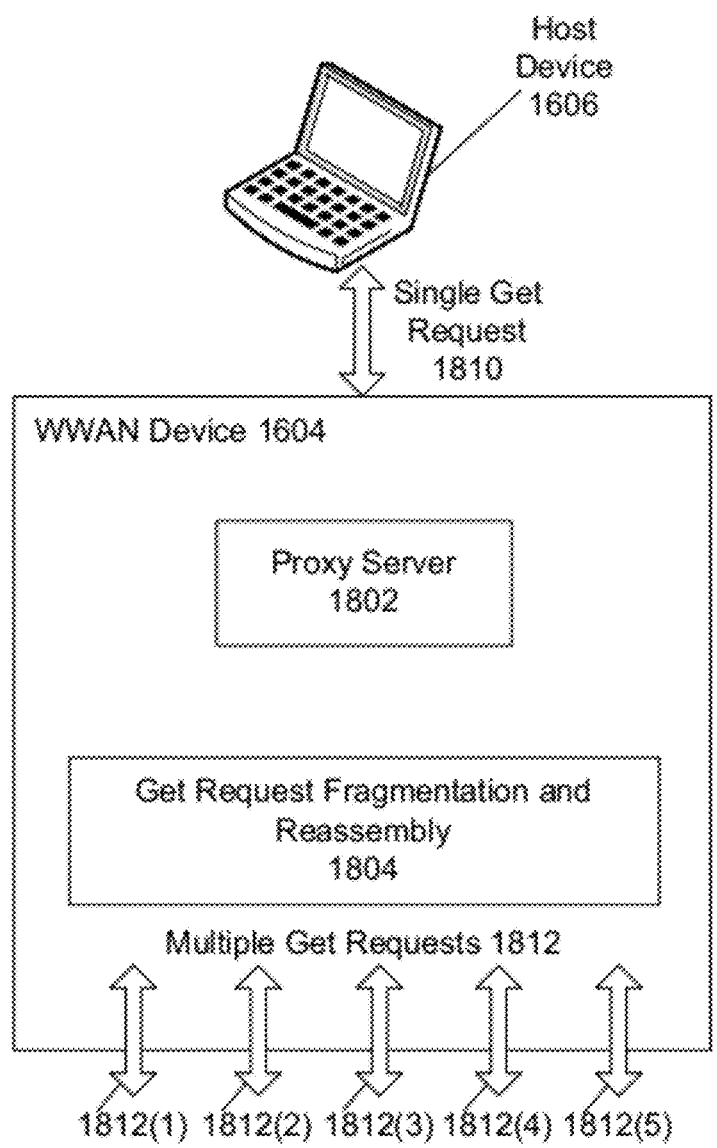
FIG. 18 is a block diagram illustrating designated modular components configured to process a file transfer request that has been transmitted from a host device in accordance with one embodiment.

FIG. 18 is a high level block diagram illustrating designated modular components configured to process a file transfer request that has been transmitted from a host device 1606 according to embodiments of the present invention.

A user of a host device 1606 initially selects a file to download that is stored within a remote device 1622 (shown in FIGS. 16A-16C). A single get request 1810 for the file is transmitted to the WWAN device 1604. The get request may be received at the WWAN device 1604 by any number of manners—wirelessly, as in the case depicted by FIG. 16A, over a wired or serial bus connection, as in the case depicted by FIG. 16B, or over a local data bus, as in the case depicted by FIG. 16C.

Broadly speaking, the WWAN device 1604 may contain at least two modular components for processing a single get request 1810—for example, a hypertext transfer protocol (http) get request, or file transfer protocol (ftp) get request. These components are depicted in FIG. 18 as the proxy server unit 1802 and the get request fragmentation and reassembly unit 1804.

The proxy server unit 1802 may include functionality for enabling the WWAN device 1604 to serve as a network proxy for host device 1606. That is to say, the host device 1606 may utilize an identifier (such as an internal IP address) assigned by the WWAN device 1606 for use with communications between the host device 1606 and the WWAN device 1604, while the WWAN device 1606 may utilize a separate identifier (such as an external IP address) to establish communications with remote devices 1622 accessible over the Internet Cloud 1620 (see FIGS. 16A-16C).

The proxy server unit 1802 may also include functionality for intercepting a command or instruction transmitted from a host device 1606 and intended for a remote device 1622, processing the command in any number of ways, and for transmitting a new set of commands to the remote device 1622.

The WWAN device 1604 may also include a get request fragmentation and reassembly unit 1804 according to various embodiments. The get request fragmentation and reassembly unit 1804 essentially enables the WWAN device 1604 to fragment the single get request 1810 into multiple get requests 1812, cache the blocks of data returned from the remote device 1622, and reassemble the blocks before transmitting the requested data to the host device 1606. Note that while five separate get requests are depicted in FIG. 18 by reference numerals 1812(1)-1812(5), persons skilled in the art will recognize that any number of separate get requests may be employed according to embodiments of the present invention. By utilizing multiple get requests over separate network connections with the remote device 1622, a substantially larger pipe of data (over a contiguous or non-contiguous band) can be transmitted from the remote device 1622 to the WWAN device 1604 and ultimately to the host device 1606, thereby increasing download transmission rates.

Figure 19:
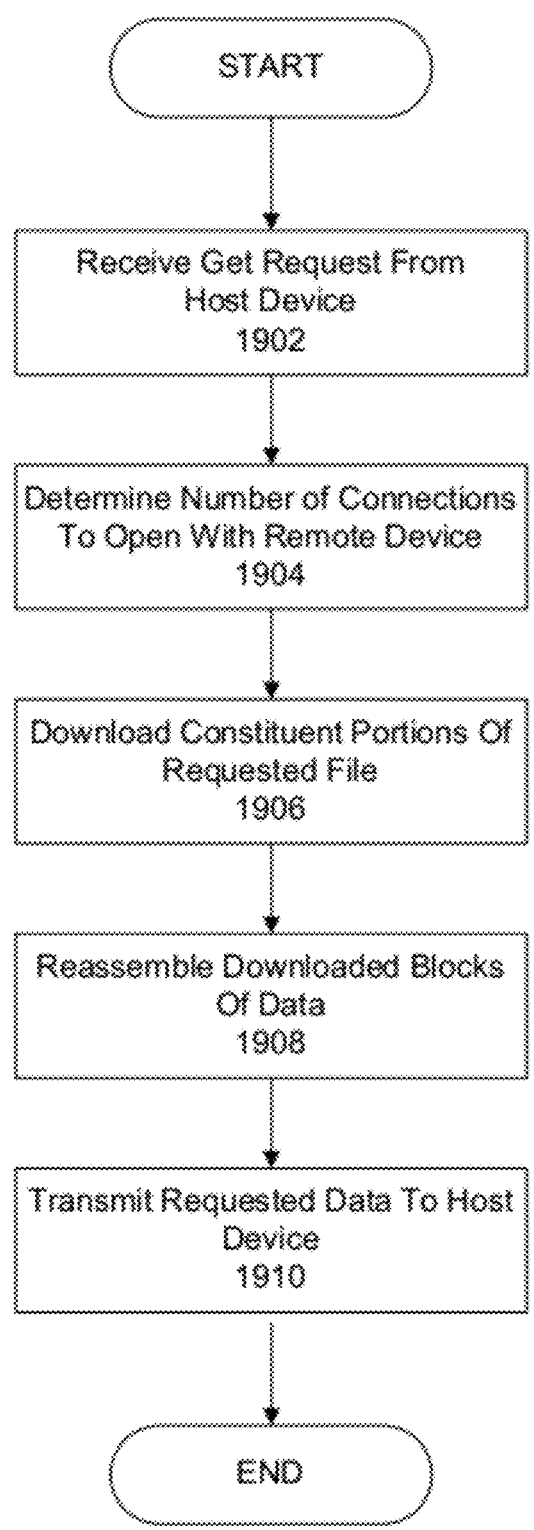
FIG. 19 is a flow diagram illustrating an exemplary method of processing a get request in accordance with one embodiment.

FIG. 19 is a flow diagram illustrating an exemplary method of processing a get request according to embodiments of the present invention. At block 1902, a request to download a file (e.g., an http or ftp get request) is received from a host device. In some embodiments, a large volume of get requests may be received from the host device. These requests may be cached or stored within a data structure for subsequent processing. Any number of data structures or data structure combinations may be used for this purpose, including, for example, arrays, queues, stacks, heaps, linked lists, circular lists, hash tables, and databases.

At block 1904, the system determines the number of connections to open with the remote device. This determination may depend upon one or more factors. In some embodiments, for example, the number of connections with the remote device may depend upon the amount of data being transferred or the size of the file requested for download. One or more set-size rules may be used to determine the number of connections to open with the remote device according to various file size ranges. For example, 20 separate connections may be opened for a file that is over 500 Mb in size, while only a single connection may be used for a file having a size that is below one kilobyte. In other embodiments, the number of connections to be opened may be independent of file size.

Optionally, a maximum number of connections limit may also be utilized as a means of preventing the remote device from imposing rules which might otherwise disconnect, suspend, or ban the IP address or domain associated with a particular WWAN device that is attempting to open multiple connections. These rules are geared at preventing resource lock-outs, hammering, or perceived network attacks originating from a remote computing device (in this case, the host device).

The number of connections to open with the remote device may also turn upon various characteristics of the network connection. For example, in some embodiments, the number of connections to open may depend upon server capability or WAN link throughput. In some embodiments, the number of connections to open may depend upon the quality of the connection—e.g., channel to interference (C/I+N) or signal to noise ratios (SNR). Also, according to some embodiments, if the quality of networking conditions or server access changes during the file transfer, new connections with the remote device may be initiated, existing connections may be reinitiated using different parameters, or connections that have completed transfer can be reused.

The number of connections to open with the remote device may also turn upon the maximum number of connections allowable by the remote device. This data may be retrieved, for example, as part of a networking handshake protocol or before data transfer has been initiated. If such data is retrieved, the WWAN device may be configured to limit its maximum number of connections with the remote device according to the value specified in the retrieved data.

Additionally, according to some embodiments, the number of connections to be opened with the remote device may turn in part upon the particular networking protocol employed (for example, HSPA, LTE, WiMax, etc.). Such protocols require data transmissions to comply with certain standardized rules which can constrain the behavior of the WWAN device if the device is to maintain compliance with the standard.

In cases where a large volume of files has been designated for download from the same remote device, the WWAN device may utilize multiple connections in order to perform simultaneous downloads. For example, if a user has specified 5000 small files for download and the WWAN device is configured to open a maximum of 5 separate connections, the 5000 files may be downloaded five at a time instead of one at a time, thereby substantially increasing download speeds. According to some embodiments, the number of connections that may be opened with the remote device may therefore also turn upon the number of files requested.

In some embodiments, the variables used for determining the number of connections that can be opened with a remote device may be adjusted by one or more authorized users through a configuration utility resident within the WWAN device. This configuration utility can allow a user with administrative access to configure the set-size rules, the maximum number of allowable connections, the dependencies between new connections and WLAN throughput, as well as various other behaviors of the WLAN device that are dependent upon network quality such as carrier to interference, signal to noise ratios, etc. In one embodiment, the configuration utility may be accessible to the user upon connecting to the WWAN device from a web browser installed within the host device (e.g. 192.168.1.1).

Once the number of connections to open with the remote device has been determined, at block 1906, the various constituent portions of the requested file are then downloaded. The total size of the file may be used to determine the starting point/starting block for each of the separate downloads. In some embodiments, for example, the size of each constituent portion may be kept the same or substantially the same in order to further increase download speeds. In other embodiments, the size of each constituent portion may depend upon respective channel qualities. For example, if a first connection with the remote device has a low throughput, while a second connection a high throughput, then the first constituent portion may be specified to be commensurately smaller than the second. In some embodiments, if a download has completed in one connection and there are still incomplete downloads from other connections, the system may reconfigure itself to assign a new download task to the connection which has recently completed its download. The balance of unsent data may then be redivided with respect to one or more connections.

Also, according to some embodiments, the system may also be configured to support a "resume" feature that enables partially completed downloads of one or more constituent portions to resume in the event of a power failure, network failure, server reset, or server shutdown.

At block 1908, the returned blocks are then reassembled at the WWAN device. Any number of supplementary integrity checks (CRC, hashing, etc.) may be run on reassembled data to ensure that the file has transferred properly and/or has not been corrupted. Optionally, one or more layers of encryption may be applied to the file before being transmitted to the host device. At block 1910, the data is transmitted to the host device, and the process then ends.

Some embodiments of the present invention are adapted to cooperatively operate with an internal or external message split controller, where said message split controller is operative to split a message into a plurality of message fragments according to one or more predetermined criteria and to include with each said message fragment an identifier of where said message fragment was located within said message. The message fragment may then be transmitted as a separate electromagnetic signal via a separate selected transmitting source over a corresponding selected radio frequency.

According to these embodiments of the invention, the message may be split into at least two message fragments and each message fragment sent simultaneously (or sequentially) via multiple independent transmitting sources over several radio frequency ("RF") channels using one or more air interfaces. Although different in fundamental ways, OFDM (Orthogonal Frequency Division Multiple Access) technology is similar to embodiments of the invention in that a given message is split and sent over a selected cluster of RF channels. However, the OFDM technology is not as effective as embodiments of the invention in increasing bandwidth for data transmission because only one transmission source is used, the same modulation and coding scheme is used by all of the selected channels, and a single protocol stack is used by all of the selected channels. In various embodiments of the present invention, however, the message fragments may be sent via multiple independent sources. Accordingly, the selected channels may use different signaling schemes, and each utilized network is not limited by having to use the same protocol stack.

In some embodiments of the present invention, the message to be split may comprise a Hypertext Transfer Protocol (HTTP) file and the message fragments into which the message is split are portions of that HTTP file. Such portions of an HTTP file may be predefined ranges within an HTTP file. For example, the predefined ranges may be representative of a certain range of bits/bytes making up a message. Additionally, the predefined ranges representative of certain ranges of bytes may also indicate where the message fragment belongs in a full message upon combining the message fragments at a receiving unit (e.g., within IMHS 304).

Table 1 below illustrates a key difference between embodiments of the present invention and the prior art OFDM technology.

TABLE 1

|  | OFDM | Embodiments of Invention |
|---|---|---|
| Source of the message | One single source | Multiple independent sources |
| Modulation/coding type | The same modulation/coding type is used by all the channels | Channels may use different (independent) signaling schemes |
| Protocol stack | One protocol stack for all channels | Every network may be using a different protocol stack |

In various other embodiments of the invention, at least two independent files can be transmitted (or received) across at least two independent networks (i.e. no fragmentation and no fragment identification). In one example, one file can be a voice stream and another file can be a video stream. Other example file types can include, but are not limited to, an HTTP session, a data file, and/or an FTP file. In one embodiment, two (or more) separate applications can be running simultaneously on a multimode device where one (or more) application communicates with a first server via a first network and a second (or more) application communicates with a second server via a second independent network.

Figure 20:
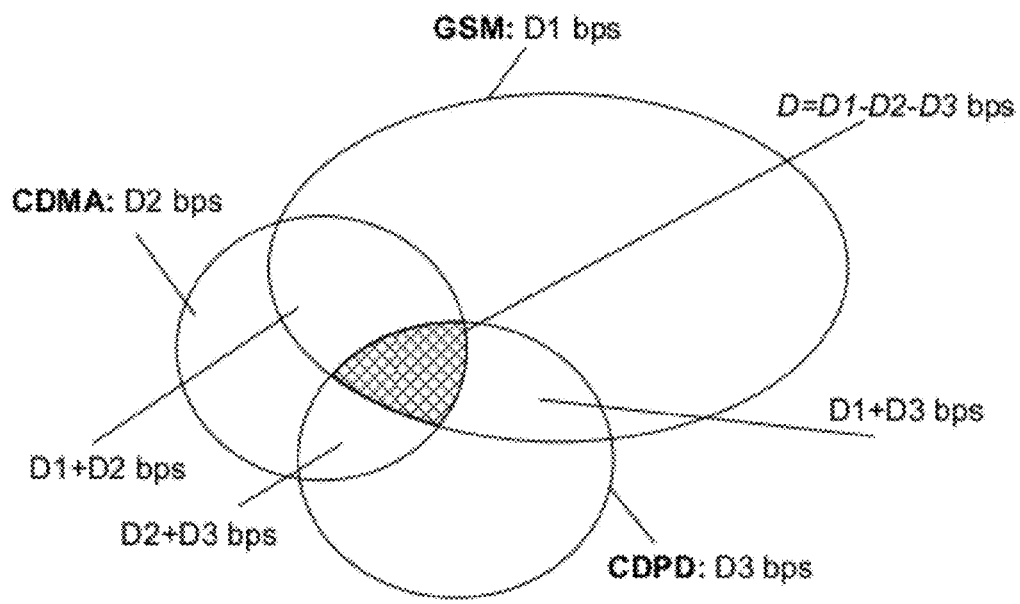
FIG. 20 illustrates an effective throughput/coverage performance in an exemplary cellular region that can be achieved according to one embodiment.

FIG. 20 illustrates an effective throughput and coverage performance that can be achieved according to one embodiment of the present invention. Three independent transmitting sources (or "networks") are available in the exemplary cellular region illustrated in FIG. 20: GSM having a data transmission rate or throughput of D1 bits per second ("bps"); CDMA having a throughput of D2 bps; and CDPD having a throughput of D3 bps. FIG. 20 shows that one embodiment may be used, for example, to split a message into three message fragments and to send a different message fragment via each network. In such a case, the effective throughput would be the aggregate of the throughput for the individual networks, or D1+D2+D3. Alternatively, three independent files or messages can be sent each via one of the networks. In still another embodiment, one file can be sent via one network and another message can be fragmented with the fragments each being sent via one of the other networks.

It should be noted that any number/combination of independent files and/or messages which may or may not be fragmented can be sent via an appropriate number/combination of networks in accordance with various embodiments of the present invention. For example, and referring to the three-network scenario of FIG. 20, first and second independent files may be sent via two of the networks, while an unfragmented message may be sent via the remaining network. Alternatively, and as another example, a first message or set of messages are transmitted via an appropriate number/combination of networks sequentially or simultaneously with a second message(s) that is fragmented, where each of the second message fragments are themselves transmitted using an appropriate number/combination of networks.

Further still, and in a scenario where five networks are available for transmission, two independent files may be transmitted via two of the five networks, one independent message may be transmitted via a third network, and message fragments of a fourth message may be transmitted via the remaining two of the five networks. In accordance with another scenario, two or more files and/or messages may be transmitted over one network, while message fragments of another message are transmitted over an appropriate number/combination of still other networks. In accordance with yet another scenario, subsets of message fragments may be transmitted via/received over an appropriate number/combination of networks. For example, if a message is split into three fragments, two of the three fragments may be transmitted over a first network, while the remaining fragment is transmitted over a second network.

Figure 21:
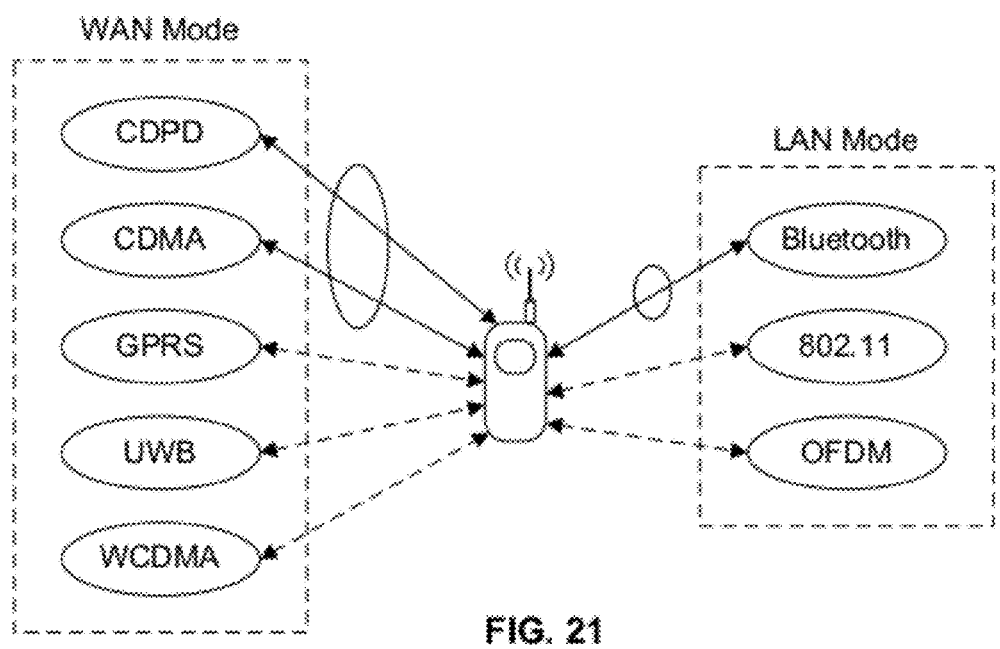
FIG. 21 is a diagram showing a parallel multimode operation of a modem device according to one embodiment.

FIG. 21 is a diagram showing a parallel multimode operation of a modem device according to one embodiment of the present invention. This device is constructed to operate in LAN and/or WAN mode, and supports a plurality of standards in each mode, i.e., CDPD, CDMA, GPRS, UWB, WiMAX, LTE, 1×EVDO, DORA, HSPA and/or WCDMA in the WAN mode, and Bluetooth, IEEE 802.11, OFDM in the LAN mode. The illustrated device according to one embodiment of the present invention is further constructed for simultaneous use of at least two of its compatible standards. For instance, the device might operate simultaneously with CDMA and GSM in order to increase the effective bandwidth of the data throughput to and from the modem device.

Those skilled in the art will realize that other combinations of the available standards may be utilized. Moreover, other conventional standards and even future wireless or wireline standards may be incorporated for use by the modem device to provide a maximum utilization of flexibility and bandwidth.

Figure 22:
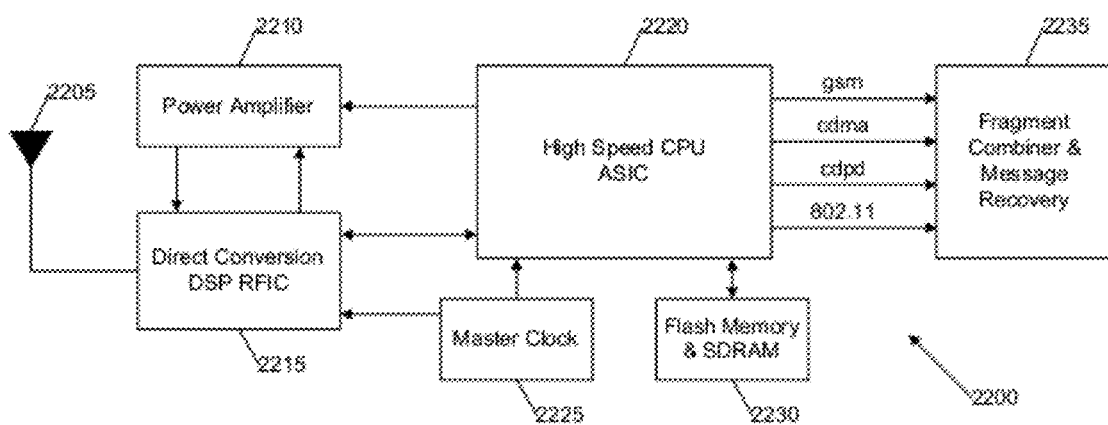
FIG. 22 is a block diagram of a multimode modem architecture according to one embodiment.

FIG. 22 is a block diagram of a multimode RF modem 2200 according to one embodiment of the present invention (note that the RF modem 2200 may serve as an IMHS according to various embodiments). In one embodiment, the RF modem 2200 may operate in a receive mode to receive electromagnetic signals carrying messages, where each message includes a stream of data bits. RF modem 2200 may also operate in a transmit mode to send electromagnetic signals carrying messages, each message including a stream of data bits. Modem 2200 is further operative to receive simultaneously or sequentially a message that has been split into at least two message fragments, wherein each message fragment includes an identifier of where that message fragment was located within the message. This enables each message fragment to be transmitted to the RF modem 2200 as a separate electromagnetic signal via a separate selected independent communications network using a corresponding radio frequency channel. In receive mode, RF Modem 2200 can recombine the message fragments into the original message.

RF Modem 2200 may comprise an antenna 2205, a power amplifier 2210, a software configurable direct conversion DSP RFIC 2215, a high speed software configurable CPU ASIC 2220, a master clock 2225, a Flash memory and SDRAM 2230, and a fragment combiner and message recovery unit 2235 (where the latter may also serve as a message splitter according to some embodiments). These components of modem 2200 may be electrically connected as illustrated by the solid lines in FIG. 22 between those components.

Antenna 2205, power amplifier 2210, clock 2225, and memory 2230 may be conventional components known on the art. A direct conversion DSP RFIC 2215 may be an RF front end component that is able to perform RF conversion in the receive mode so as to simultaneously receive at least two message fragments (or independent files or messages, or a combination of independent files, messages and/or message fragments) from different transmission sources. For each said separate electromagnetic signal, DSP RFIC 2215 may be further operative to receive the signal, detect the radio frequency over which the signal was transmitted, and downconvert the signal to generate a corresponding baseband signal. CPU ASIC 2220 is preferably a conventional component that functions as a controller or processor for modem 2200 and may also perform baseband processing and protocol stack control. In the receive mode, CPU ASIC 2220 decodes each baseband signal to generate a corresponding message fragment (or independent files or messages) having a stream of data bits and including protocol data bits and then removes the protocol data bits to enable the original message (or independent files or messages) to be recreated. In the transmit mode CPU ASIC 2220 may add protocol data bits to a stream of data bits corresponding to a message and encode the data bits into a baseband signal for processing by DSP RFIC 2215. CPU ASIC 2220 may be further operative to detect the identifier in each message fragment. Fragment combiner 2235 may be a component used to recombine the message fragments into the original message as a function of the identifier included with each message fragment. Fragment combiner 2235 may be integrated within CPU ASIC 2220 or may be a separate component.

Figure 23:
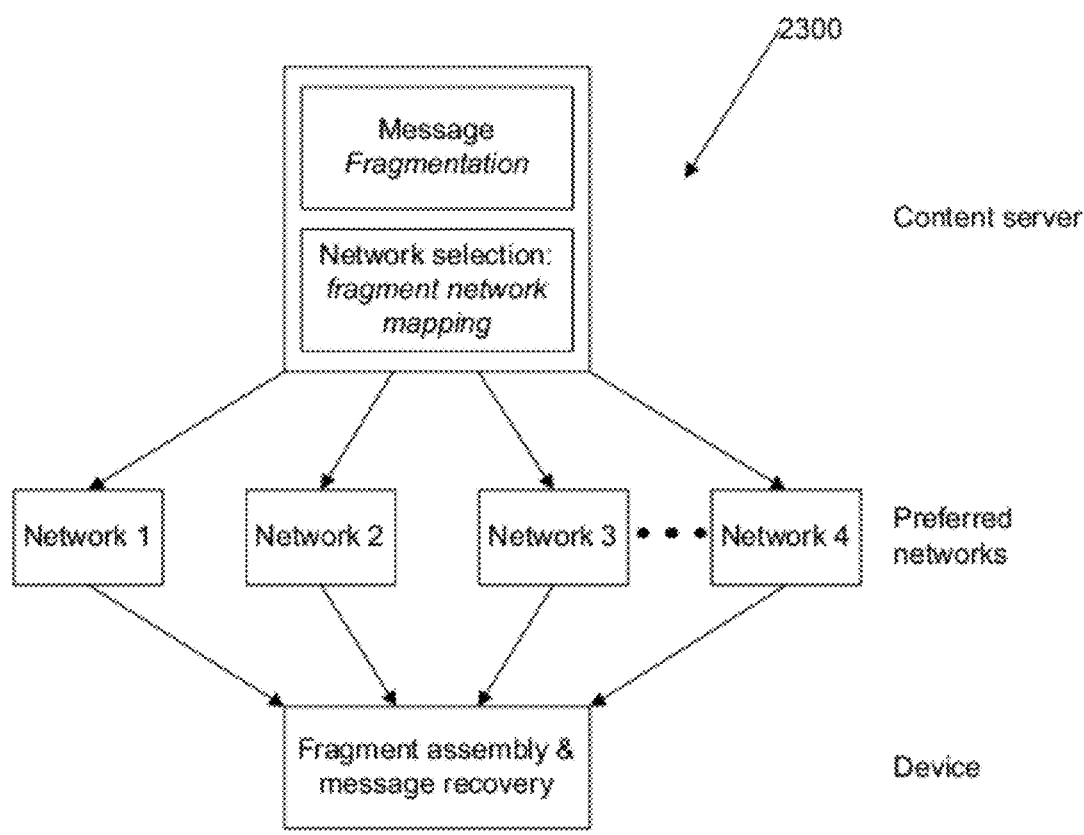
FIG. 23 is a flow chart that describes a message fragmentation and delivery method according to a one embodiment.

FIG. 23 shows a flow chart that describes a message fragmentation and delivery method 2300 according to one embodiment of the present invention. A message to be transmitted to a receiving device may be split into at least two message fragments, for example, by a content server or a remote IMHS. The message fragments may then be sent simultaneously via multiple selected transmitting sources (Networks 1 through N which may be preferred networks according to one or more predetermined criterion) over several radio frequency channels, preferably using different air interfaces (a heterogeneous transmission technique). Alternatively, multiple independent messages or files can be sent simultaneously via multiple selected transmitting sources. The message fragments (or messages) could also be sent via multiple transmitting sources using the same air interfaces (a homogeneous transmission technique). The message fragments may then be reassembled by a receiving device ("terminal") (e.g., IMHS 304) to generate the original message.

More specifically, after a message intended to be delivered to a terminal is broken into two or more fragments, the fragments are preferably numbered to facilitate message reassembly at the receiver end. The message fragmentation operation also preferably takes place within an externally located content server. In packed data networks, packet numbering is not required. Transmission Control Protocol/Internet Protocol ("TCP/IP") can be used to perform numbering. Each fragment is then carried by a different network.

For example, within a geographic area where both GSM and CDMA networks are deployed, the GSM network may carry the first fragment of the message while the CDMA network may carry the second fragment of the message. Alternatively, the GSM network can carry a first message or file and the CDMA network can simultaneously carry a second message or file. The receiving device (e.g., an IMHS) may have the capability of decoding both fragments of the message (or both messages) and of reconstructing the original message from the fragments. In some embodiments, configurable software may be used to more easily achieve this task.

There are many ways of implementing method 2300. A specific example is as follows. A large streaming video is to be sent by MPEG4 encoding over a wireless connection. Assume there are two standards available in a region. For the purposes of this example, we will also assume the standards are IS-95B and CDPD, with data rates of 14400 plus 19200 bps, respectively, which are to be combined to obtain an aggregate rate of 33600 bps. The image is broken into two parts, with one standard carrying 14400/33600 or 43% of the data and the second carrying 19200/33600 or 57% of the data to obtain the aggregate transfer rate of 33600 bps. In other words, the streaming video image data may be divided proportionally to match the data transfer rate of each of the available channels in order to obtain the desired increased data throughput. In another embodiment, a video stream can be sent via one network, for example the CDPD network, and a voice stream can be sent via the other network, for example the IS 95B network. In these examples, the effective data rate into the receiving device can be doubled by simultaneously using the two networks to transmit the message fragments. Generally, the potential for increasing the effective data rate at the receiving device is only limited by the networks available for transmitting data, if the device is constructed with the required software and hardware capabilities.

Figure 24:
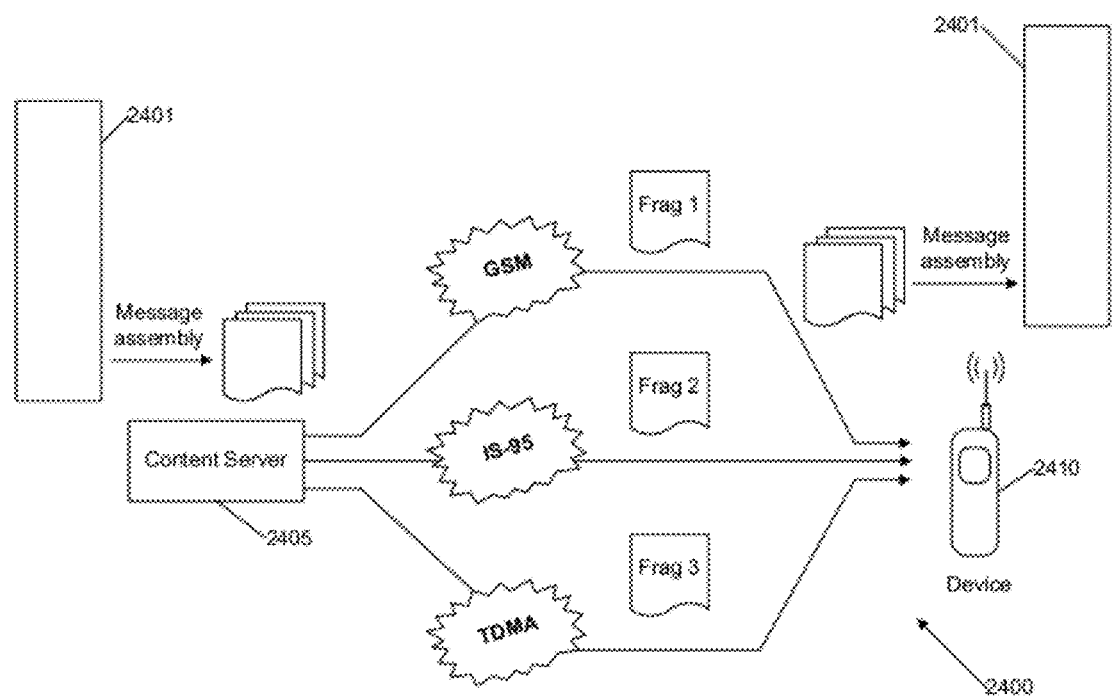
FIG. 24 is a diagram illustrating a method for fragmenting a message to be delivered across three independent networks according to one embodiment.

FIG. 24 is a diagram illustrating a method 2400 for fragmenting a message to be delivered across three networks according to one embodiment of the present invention. This method can also be used to send three messages simultaneously or even two messages in which one or both of the messages are fragmented. In this example, a content server 2405 (or alternatively, a remote IMHS) may split a message 2401 into three message fragments: Frag1, Frag2 and Frag3. Frag1 is transmitted via a GSM network. Frag2 is transmitted via an IS-95 network, and Frag3 is transmitted via an TDMA network. Receiving device 2410 (illustrated here as a mobile telephone but may also be an IMHS in the alternative), may assemble the message fragments to recreate message 2401.

Figure 25:
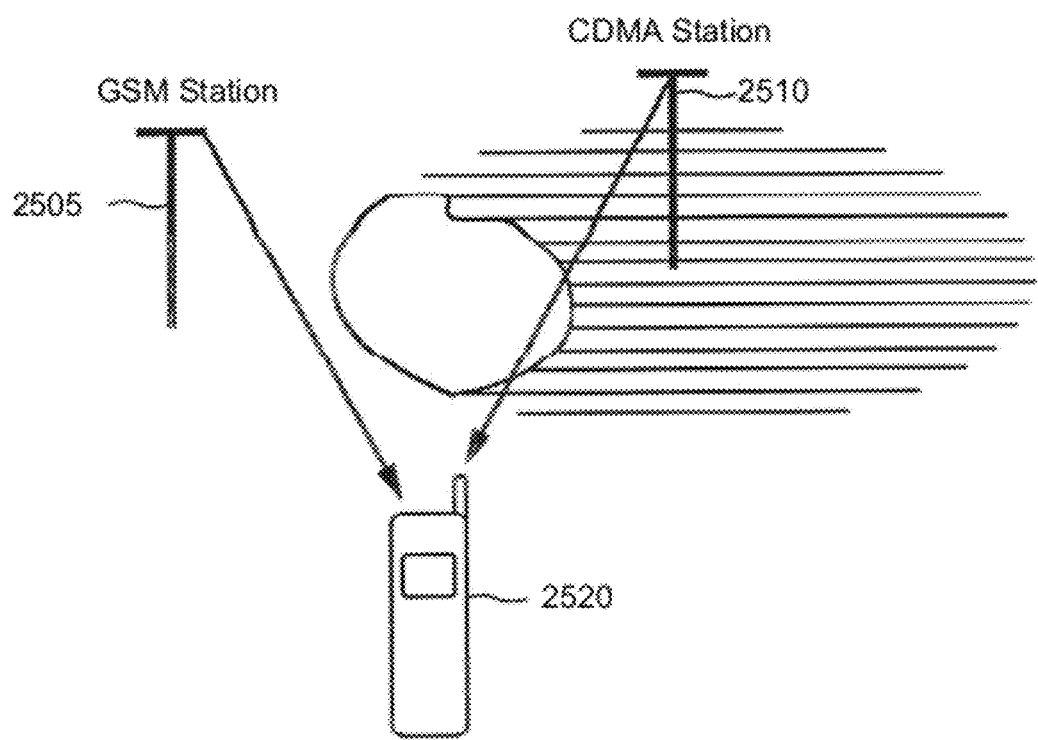
FIG. 25 is a diagram illustrating how a split message is delivered using two independent networks, where they overlap in the coverage area.

FIG. 25 is a diagram illustrating a single message being split into two message fragments and the fragments simultaneously delivered via a GSM base station and a CDMA base station, wherein device 2520, illustrated here as a mobile telephone (but may be an IMHS in the alternative) recombines the message fragments to generate the original message. The GSM base station and the CDMA base station overlap in coverage area.

The operation of message fragmentation can be performed by a variety of devices, for example a mobile device or proxy server/IMHS. Those skilled in the art will realize that the message fragmentation operation can also take place at a mobile switching center a network controller or at a transmitter controller. For the sake of simplicity, only message fragmentation at the proxy server level is described below.

Figure 26:
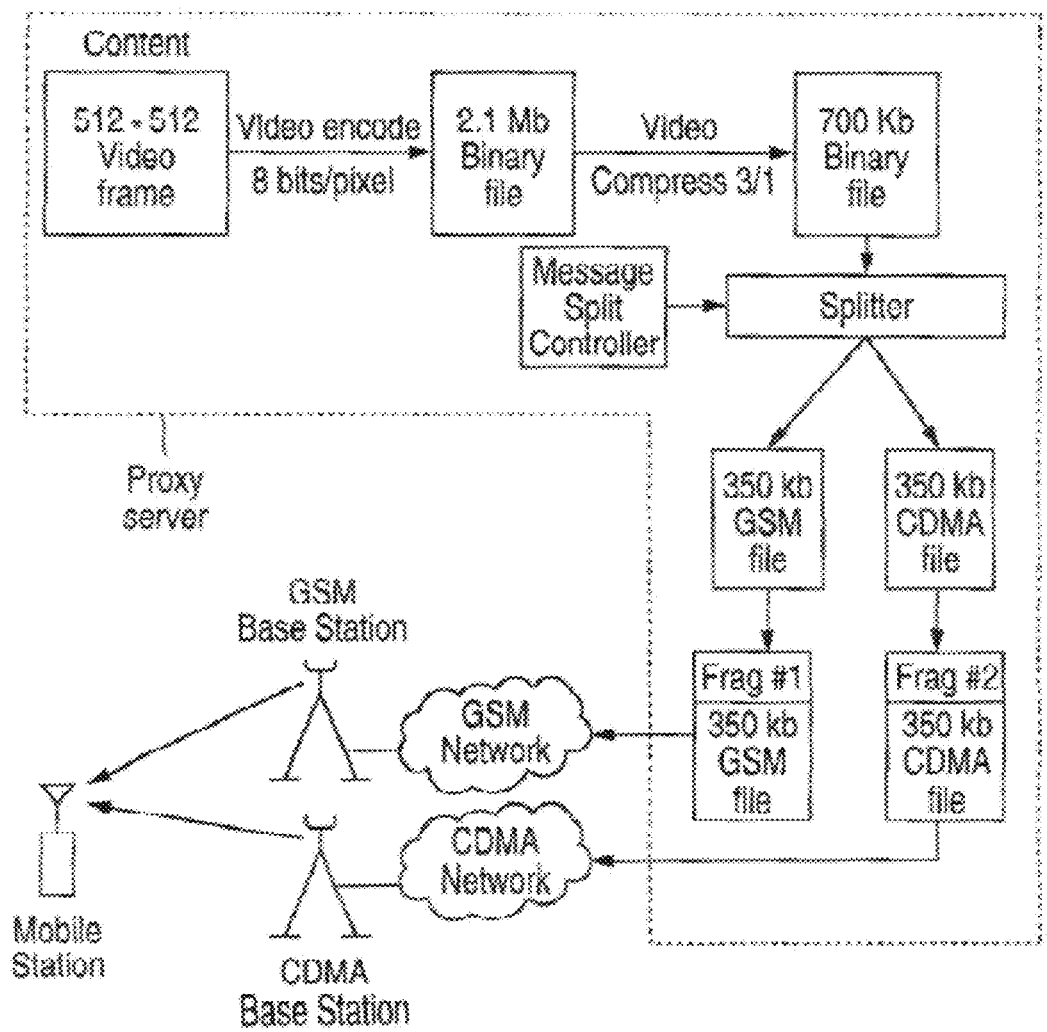
FIG. 26 is a block diagram illustrating the operation of message fragmentation at a proxy server.

FIG. 26 depicts the operation of message fragmentation at a proxy server connected to the Internet, for example, so that the message can be sent to an Internet Protocol address associated with an intended receiving unit. The proxy server includes an Internet communications adapter and a software program executed by the proxy server. A video image is used for illustration purposes. A compressed video image is divided into two fragments. A message split controller is responsible for the message split operation. The size of each fragment is determined depending upon the available bandwidth on each network selected to transmit the message fragments. In one embodiment, the message split controller is an Internet server. Some examples of suitable Internet servers can include HTTP servers and/or HTTP range servers.

Other criteria may also be considered during the fragmentation process. For instance, the message may be fragmented into pieces or the route of independent files may be determined according to a Quality of Service ("QoS") criterion, such as latency, cost, required power, battery life, etc. The role of the message split controller is to orchestrate the operation of message fragmentation according to predefined QoS rules. For example, voice signals (less tolerant to network latency) may be sent on a circuit switch network while data files (more tolerant to latency) can be sent on a packet switch network. Each message fragment or message may have a QoS indicator attached to it so that the message fragment is sent using a network that satisfies the corresponding QoS requirement.

Message fragmentation can also be done at a packet level. For instance, multiple packets may be interleaved before being transmitted over the different networks, which can be either homogeneous or heterogeneous networks. Interleaving helps equalize the overall system performance in terms of latency, packet error rate, coverage, etc. Packet interleaving introduces diversity into the system.

Figure 27:
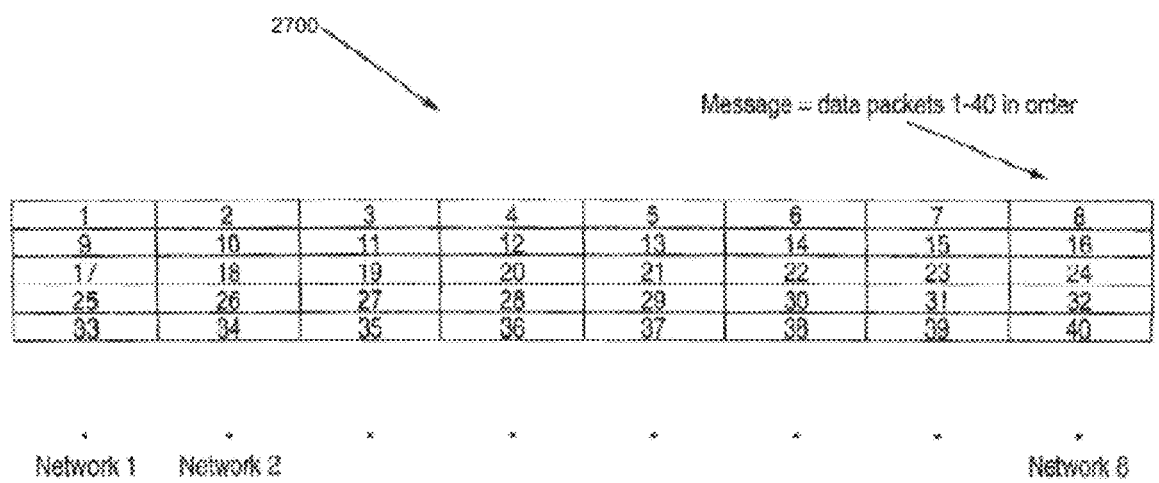
FIG. 27 is an illustration of a method according to the present invention, wherein interleaved and transmitted over multiple networks.

FIG. 27 illustrates an interleaving table 2700 that may be used to facilitate data transmission according to the present invention. According to the interleaving table illustrated in FIG. 27, packets 1 through 40 are ordered row-wise and transmitted column-wise over Networks 1 through N. Each column of packets may be sent over a different network. To illustrate the benefits of interleaving according to interleaving table 2700, suppose that Network 1 is a low reliability network and that packet 1 was unsuccessfully sent over Network 1. Because of interleaving, packet 1 will be retransmitted on another network other than Network 1, thereby giving packet 1 an increased chance of being successfully received on the second try. Without packet interleaving, packet 1 would have been assigned exclusively to unreliable Network 1 and therefore would take more time than other packets to reach its final destination. This would in turn introduce backlog in Network 1 and resultantly cause the message reconstruction at the receive end to be delayed.

In the FIG. 27 illustration, interleaving is done at the packet level. However, those skilled in the art will realize that interleaving can be done at a fragment level or even at a bit level.

Referring again to FIG. 26, at the receiver end, the message is simply reconstructed by reordering all of the received packets. In addition, the selection of which networks to use may be accomplished in a number of ways. For instance, the receiving unit/IMHS may monitor a cellular region to detect RF activity relative to multiple channels each supporting different standards. If the receiving unit is not the IMHS, the receiving unit can then report to the IMHS a list of RF channels detected as well as the air interfaces used. The reported information may be used by the IMHS to split a message and transmit the message fragments in accordance with that list. Alternatively, the receiving unit may suggest to the IMHS to perform message fragmentation according to one or more preferred rules.

Moreover, the list of existing protocols such as TCP/IP can guarantee message fragment ordering without numbering the packets prior to message transmission. In the situation where circuit switch networks are used, packets must be numbered according to any conventional numbering rule prior to transmission, and a mobile device for instance, may reassemble the received packets according to the applicable numbering rule.

Figure 28:
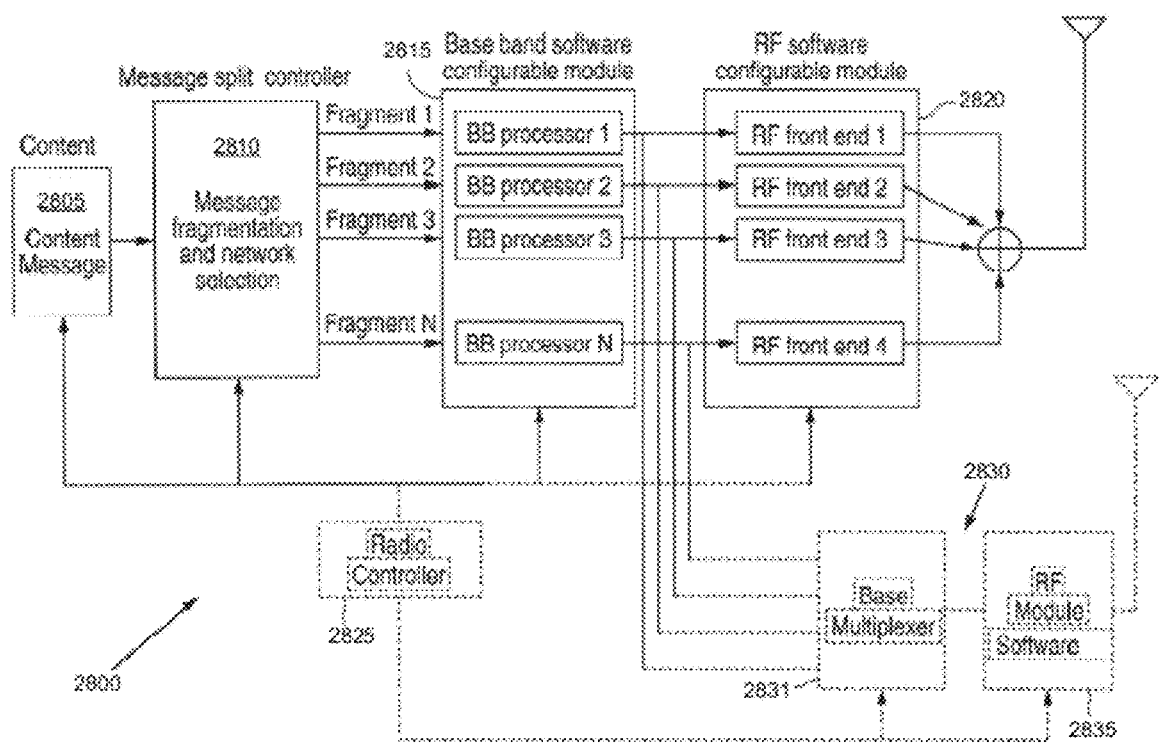
FIG. 28 is a block diagram of a one embodiment of an RF modem architecture according to one embodiment.

FIG. 28 is a block diagram illustrating an RF modem 2800 that can be included within a mobile device, capable of message fragmentation according to an embodiment of the present invention. Modem 2800 may comprise all of the components as illustrated in modem 2200 of FIG. 22. Specifically, modem 2800 may include a suitable power amplifier device, an RFIC device capable of producing the appropriate baseband signals, and a CPU/ASIC device with suitable memory capable of recovering binary data from the baseband signals received from the conversion RFIC device and a fragment combiner and message recovery device. Modem 2800 may further comprise a message split controller 2810 coupled to the CPU/ASIC and used to fragment a message, intended for transmission, according to a predefined rule. In one embodiment, the rule of message fragmentation and/or network selection is based on a QoS criterion. These components work together to achieve the desired multi-mode packet transfers and aggregation over multiple standards and air interfaces.

The message fragments 1 through N of message content 2805 may be generated by message split controller 2810 and passed to baseband processor 2815, which can be software configurable. Baseband processor 2815 can be a plurality of baseband processors 1 through N connected in parallel to simultaneously process each received message fragment. Each fragment may be processed according to selected physical layer specifications. After baseband processing, the data may be passed to an RF front end for up-conversion and transmission. The RF front end for FIG. 28 can be implemented in multiple ways. One exemplary implementation 2820 is based on multiple RF front ends connected in parallel. Each RF front end is used to up-convert a single baseband signal. An alternative RF front end 2830 uses a baseband multiplexer 2831, which can be software programmable. The mixed signal may then be up-converted using a single software configurable RF circuit 2835.

Figure 29:
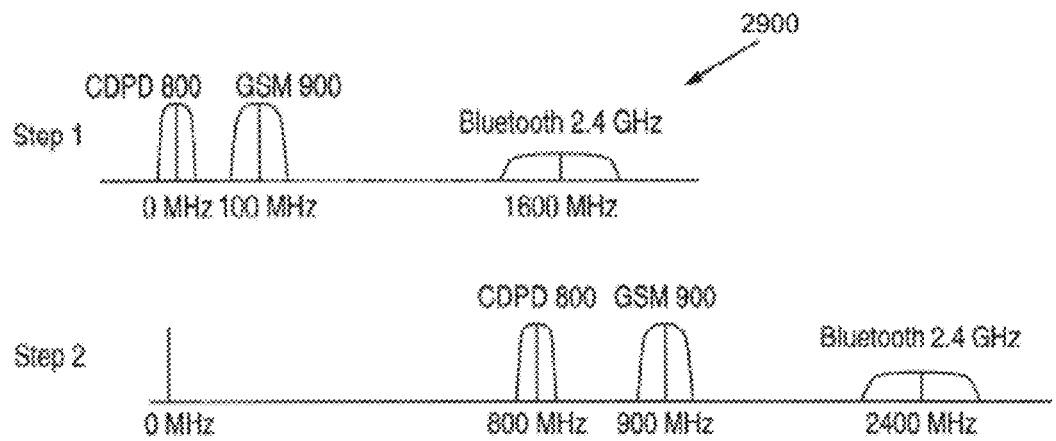
FIG. 29 illustrates an upconversion methodology when RF front end 2830 of FIG. 28 is implemented.

FIG. 29 illustrates an upconversion methodology 2900 used when RF front end 2830 of FIG. 28 is implanted. Step 1 consists of mixing baseband signals into a single baseband signal, in this example for simultaneous transmission over a CDPD network at 800 Mhz, a GSM network at 900 Mhz, and a Bluetooth network at 2.4 GHz. The resulting signal will have an effective bandwidth equal to the frequency separation between the highest and lowest frequency signals. Step 2 of the process consists of up-converting the resulting baseband signal to the required frequency.

Methodology 2900 has the unique advantage of being completely hidden to a carrier as shown by the following illustration. Assume that an aggregator for providing communications services purchases a certain amount of bandwidth from a number of carriers. Each of these carriers may be using a different technology. For instance the aggregator may have a contract with Sprint PCS (using CDMA technology) to use 100,000 wireless phone lines and another contract with AT&T (TDMA) for using another 100,000 wireless phone lines for the purpose of reselling the SPRINT and AT&T services to its customers at a lower cost with higher throughput. Now assume a customer is equipped with a wireless device that can simultaneously decode TDMA and CDMA signals, and the customer wants to download a 1 Mbyte video file to his cell phone. The following steps should take place: 1. The cell phone sends a request to the aggregator's proxy server requesting the download of a file and at same time informs the proxy that it is within coverage of both SPRINT and AT&T networks. Informing the proxy about the list of networks within coverage is optional. The proxy may already know by other means; 2. The aggregator's proxy splits the message into two portions, preferably proportional to the amount of bandwidth available on the subject networks. Each portion of the message is sent simultaneously to the cell phone using a different network, e.g. portion one via AT&T and portion two via SPRINT); and 3. The cell phone reassembles the two received data portions according to a protocol defined between the proxy and the cell phone.

Figure 30:
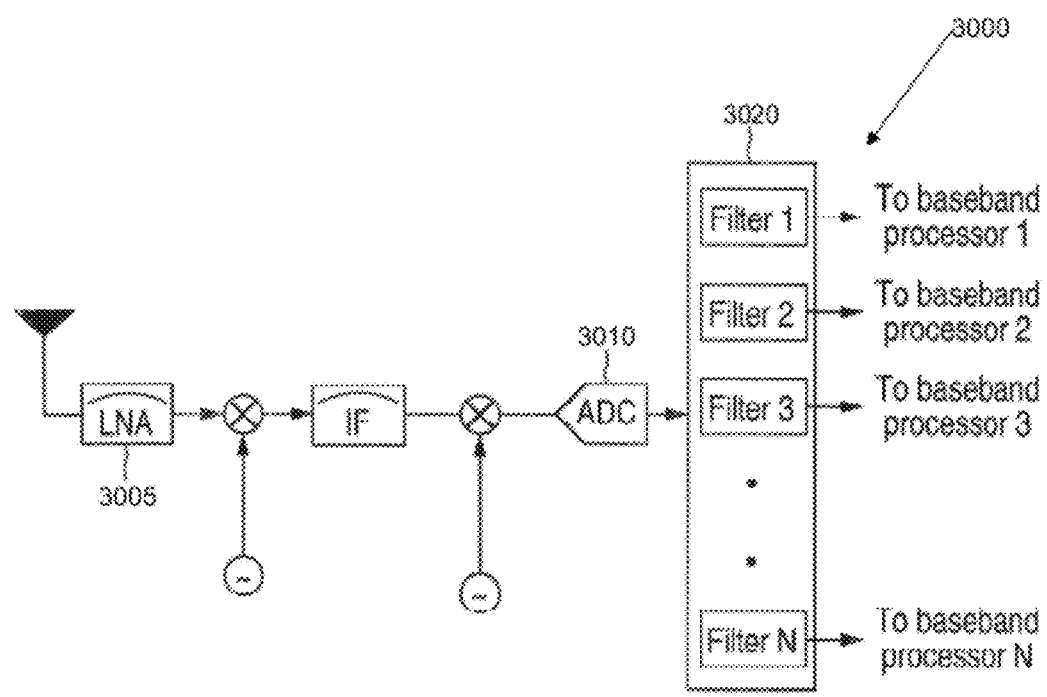
FIG. 30 is a block diagram illustrating an RF front end receiver architecture according to one embodiment.

FIG. 30 is a block diagram illustrating an RF front end receiver architecture 3000 according to an embodiment of the present invention. RF front end architecture 3000 may be suitable for the special case when a device is used to send a fragmented message or multiple messages over multiple identical networks (e.g., all GSM networks or all CDPD networks, etc.). However, architecture 3000 is preferably constructed for use with a hybrid combination of networks. Architecture 3000 may comprise a low noise amplifier ("LNA") 3005, a high rate analog to digital converter ("ADC") 3010 and a bank of digital 3020 comprising Filters 1 through N connected in parallel. The components may be electrically connected as illustrated in FIG. 30 by the lines between those components.

Architecture 3000 functions as follows. Upon passing through LNA 3005 and wherein an intermediate frequency ("IF") is generated, a large spectrum bandwidth (e.g., several MHz) is down-converted to baseband and sampled using ADC 3010. The rate of ADC 3010 is preferably at least twice the size of the down-converted frequency band. Digital filter bank 3020 may be used to tune to the receive frequency of each of the subject networks. Note that the digital filters can be identical if the receiver is performing parallel detection of homogeneous transmitted signals. Homogenous transmitted signals are signals which have a format defined according to the same air interface as opposed to heterogeneous transmitted signals which are signals transmitted according to different air interfaces. The output of digital filter bank 3020 may represent multiple baseband signals each representing a specific data network. The baseband signals are passed to a single (or multiple) baseband processors to retrieve the message fragments in a way similar to what is disclosed in connection with FIG. 23.

The embodiments described above are illustrative of the principles of various aspects the present invention and are not limited to the particular embodiments described. Also, while in some instances, embodiments are described in which a message is fragmented and sent across two or more networks simultaneously, it should be understood that two or more independent messages or files can be sent across the two or more networks simultaneously in these embodiments. It should also be understood that when two or more independent messages or files are being sent across multiple networks as described herein, any of the two or more independent messages can be fragmented and sent across the multiple networks simultaneously. Other embodiments of the present invention can be adapted for use in any RF wireless environment. Accordingly, while various embodiments of the invention have been illustrated and described, it will be appreciated that various changes can be made therein without departing from the spirit and scope of the invention.

What is claimed is:

1. A method of seamlessly increasing throughput, the method comprising:
   receiving a request to download a file, the request being received at a wireless wide area network device;
   determining a number of connections for the wireless wide area network device to open with a remote device that is hosting the file;
   opening said number of connections;
   downloading constituent portions of the file over said number of connections, the constituent portions of the file being downloaded at the wireless wide area network device;
   reassembling the constituent portions of the file at the wireless wide area network device, thereby forming the file; and
   transmitting the file to a requesting device.

2. The method of claim 1, wherein the request is in the form of an FTP Get.

3. The method of claim 1, wherein the request is in the form of an HTTP Get.

4. The method of claim 1, wherein said determining a number of connections is based at least in part upon server capability.

5. The method of claim 1, wherein said determining a number of connections is based at least in part upon a WWAN connection standard.

6. The method of claim 1, wherein said determining a number of connections is based at least in part upon the size of the file.

7. The method of claim 1, wherein said determining a number of connections is based at least in part upon WAN link throughput.

8. The method of claim 1, wherein said determining a number of connections is based at least in part upon a total number of files requested for download.

9. The method of claim 1, wherein the process further comprises specifying the sizes of each constituent portion, wherein said specifying the sizes is based at least in part upon network connection quality.

10. The method of claim 1, wherein the process further comprises specifying a substantially equal size for each constituent portion.

11. The method of claim 1, wherein said reassembling the constituent portions comprises performing at least one data integrity check.

12. The method of claim 1, wherein at least two of said number of connections employ separate network protocols.

13. The method of claim 1, wherein each of said constituent portions of the file comprises an identifier, and wherein said reassembling the constituent portions of the file further comprises determining the correct order of each of the constituent portions of the file based at least in part upon its respective identifier.

14. A wireless wide area network device configured to increase download throughput of a requesting device, the wireless wide area network device comprising:
- a receiver adapted to receive a request to download a file;
- a connections analysis module in electrical communication with the receiver, the connections analysis module adapted to determine a number of connections to open with a remote device that is hosting the file;
- a network interface module in electrical communication with the connections analysis module, the network interface module adapted to download constituent portions of the file over said number of connections;
- a reassembly module in electrical communication with the network interface module, the reassembly module adapted to reassemble the constituent portions of the file; and
- a data transmissions module in electrical communication with the reassembly module, the data transmissions module adapted to transmit the file to the requesting device.

15. The wireless wide area network device of claim 14, wherein the wireless wide area network device comprises an intelligent-mobile hotspot.

16. The wireless wide area network device of claim 14, wherein the connections analysis module is further adapted to determine the number of connections based at least in part upon the size of the file.

17. The wireless wide area network device of claim 14, wherein the connections analysis module is further adapted to determine the number of connections based at least in part upon WAN link throughput.

18. The wireless wide area network device of claim 14, wherein the connections analysis module is further adapted to determine the number of connections based at least in part upon a maximum number of connections allowable by the remote device.

19. The wireless wide area network device of claim 14 further comprising a network selection module in electrical communication with the connections analysis module, the network selection module adapted to identify a set of networks available for communication with the remote device.

20. The wireless wide area network device of claim 19, wherein said number of connections are established among the set of networks identified by the network selection module.

* * * * *